(12) United States Patent
Fenton et al.

(10) Patent No.: US 12,233,815 B1
(45) Date of Patent: Feb. 25, 2025

(54) VEHICLE SECUREMENT ASSEMBLY AND METHOD FOR MONITORING VEHICLE SECUREMENT ASSEMBLIES

(71) Applicants: Scott Ivan Fenton, Sinclairville, NY (US); Stephen Myron French, Jr., Warren, PA (US)

(72) Inventors: Scott Ivan Fenton, Sinclairville, NY (US); Stephen Myron French, Jr., Warren, PA (US)

( * ) Notice: Subject to any disclaimer, the term of this patent is extended or adjusted under 35 U.S.C. 154(b) by 837 days.

(21) Appl. No.: 17/347,648

(22) Filed: Jun. 15, 2021

Related U.S. Application Data

(60) Provisional application No. 63/039,714, filed on Jun. 16, 2020.

(51) Int. Cl.
*B60R 22/48* (2006.01)
*A61G 5/10* (2006.01)

(52) U.S. Cl.
CPC ............... *B60R 22/48* (2013.01); *A61G 5/10* (2013.01); *B60R 2022/4825* (2013.01); *B60R 2022/4858* (2013.01)

(58) Field of Classification Search
CPC ............ B60R 22/48; B60R 2022/4825; B60R 2022/4858; A61G 5/10
See application file for complete search history.

(56) References Cited

U.S. PATENT DOCUMENTS

| | | | | |
|---|---|---|---|---|
| 5,131,594 A * | 7/1992 | Refior | ................... | B60R 22/44 |
| | | | | 242/372 |
| 5,553,804 A * | 9/1996 | Hamann | ............... | B60R 22/343 |
| | | | | 280/807 |
| 5,744,944 A * | 4/1998 | Danstrom | ............... | G05F 1/565 |
| | | | | 323/284 |
| 6,290,160 B1 * | 9/2001 | Strobel | ................... | B60R 22/34 |
| | | | | 242/383 |
| 6,865,682 B1 * | 3/2005 | Talbot | ........................ | G06F 1/26 |
| | | | | 713/300 |
| 10,457,208 B1 | 10/2019 | Moffa | | |
| 2001/0001031 A1 * | 5/2001 | Craft | .................... | A61G 3/0808 |
| | | | | 410/7 |
| 2005/0080533 A1 * | 4/2005 | Basir | ................. | B60R 21/01516 |
| | | | | 701/45 |
| 2006/0183047 A1 * | 8/2006 | Ikami | ................... | G03G 9/0804 |
| | | | | 430/105 |
| 2006/0214043 A1 * | 9/2006 | Nomura | .............. | B60R 22/3413 |
| | | | | 242/379.1 |
| 2006/0249617 A1 * | 11/2006 | Cardona | ............... | B60R 22/353 |
| | | | | 242/382.1 |

(Continued)

*Primary Examiner* — Frank B Vanaman
(74) *Attorney, Agent, or Firm* — Harter Secrest & Emery LLP; Michael Nicholas Vranjes

(57) ABSTRACT

A retractable securement assembly, including a frame, a shaft rotatably connected to the frame, the shaft including a first end and a second end, a spring assembly connected to the first end, the spring assembly operatively arranged to bias the shaft in a first circumferential direction, a line connected to the shaft and arranged to form a coil around the shaft in a fully retracted state, and an electronics assembly, including a plate non-rotatably connected to the second end, and a circuit operatively arranged proximate the plate to retrieve information about the shaft or the line and send the information to a remote location.

6 Claims, 12 Drawing Sheets

(56) References Cited

U.S. PATENT DOCUMENTS

| | | | |
|---|---|---|---|
| 2007/0265735 A1* | 11/2007 | Chigusa | G06N 5/043 |
| | | | 701/1 |
| 2008/0211442 A1* | 9/2008 | Odate | B60R 22/46 |
| | | | 318/449 |
| 2009/0177357 A1* | 7/2009 | Long | B60R 22/48 |
| | | | 701/45 |
| 2013/0088348 A1* | 4/2013 | Verachtert | G06F 11/30 |
| | | | 434/308 |
| 2017/0018968 A1* | 1/2017 | Ngahu | H02J 50/12 |
| 2019/0061683 A1 | 2/2019 | Jessup et al. | |
| 2019/0103651 A1* | 4/2019 | Yanagida | H01Q 1/2216 |
| 2019/0256040 A1* | 8/2019 | Romero Elizondo | |
| | | | B60R 22/347 |
| 2019/0308524 A1* | 10/2019 | Kominato | H01Q 1/32 |
| 2020/0047666 A1 | 2/2020 | Moffa | |
| 2020/0290534 A1* | 9/2020 | Hemmelgarn | B60N 2/18 |

\* cited by examiner

VEHICLE SECUREMENT ASSEMBLY AND METHOD FOR MONITORING VEHICLE SECUREMENT ASSEMBLIES

CROSS-REFERENCE TO RELATED APPLICATIONS

This application claims the benefit under 35 U.S.C. § 119 (e) of U.S. Provisional Patent Application No. 63/039,714, filed Jun. 16, 2020, which application is incorporated herein by reference in its entirety.

FIELD

The present disclosure relates generally to securement assemblies, and more particularly, vehicle securement assemblies, and even more particularly, to a method for monitoring vehicle securement assemblies.

BACKGROUND

A seatbelt (also known as a seat belt or safety belt) or a vehicle securement device, is a vehicle safety device designed to secure the driver or a passenger of a vehicle against harmful movement that may result during a collision or a sudden stop. A seat belt reduces the likelihood of death or serious injury in a traffic collision by reducing the force of secondary impacts with interior strike hazards, by keeping occupants positioned correctly for maximum effectiveness of the airbag (if equipped) and by preventing occupants being ejected from the vehicle in a crash or if the vehicle rolls over. When in motion, the driver and passengers are travelling at the same speed as the car. If the driver makes the car suddenly stop or crashes it, the driver and passengers continue at the same speed the car was going before it stopped. A seatbelt applies an opposing force to the driver and passengers to prevent them from falling out or making contact with the interior of the car (especially preventing contact with, or going through, the windshield). Seatbelts are considered Primary Restraint Systems (PRS), because of their vital role in occupant safety.

Similarly, wheelchair tie downs or wheelchair restraints are another form of vehicle securement device used to lock a wheelchair to a vehicle. For example, in handicap accessible vans it is desirable to be able to load a wheelchair and its occupant into the van and quickly and easily secure the wheelchair, and its occupant, to the vehicle. This is often done using a plurality of wheelchair tie downs, which are the straps and hooks that connect wheelchairs to the floor of a vehicle. These are most often used as a four-point tie down system that are secured to the floor, and may be retractable or manually adjusted. The vehicle may also include wheelchair seatbelts or securement, which include a strap that is arranged across the chest area and/or waist of the wheelchair occupant, further securing the occupant in the wheelchair (which is secured to the vehicle floor).

Existing seat belts have sensors that detect when the male buckle is secured to (i.e., fully engaged with) the female buckle in order to indicate that the seat belt is connected. However, such sensors do not always accurately verify that the seat belt is properly secured. For example, a passenger such as a child may secure the seat belt behind them. In such case, the sensor would incorrectly indicate that the seat belt is properly secured since the male buckle is fully engaged with the female buckle. Additionally, such buckle sensors do not work for wheelchair tie downs, since wheelchair tie downs do not have a male and female buckle engagement, but rather utilize a hook that engages a wheel of the wheelchair.

Therefore, there is a long felt need for a securement assembly that includes sensors that more accurately detect the state of the securement assembly. Additionally, there is a long felt need for a system and method for monitoring the state of securement assemblies in a vehicle and logging data regarding the same.

SUMMARY

According to aspects illustrated herein, there is provided a retractable securement assembly, comprising a frame, a shaft rotatably connected to the frame, the shaft including a first end and a second end, a spring assembly connected to the first end, the spring assembly operatively arranged to bias the shaft in a first circumferential direction, a line connected to the shaft and arranged to form a coil around the shaft in a fully retracted state, and an electronics assembly, comprising a plate non-rotatably connected to the second end, and a circuit operatively arranged proximate the plate to retrieve information about the shaft or the line and send the information to a remote location.

In some embodiments, the plate comprises at least one magnet and the circuit comprises at least one sensor, the at least one sensor operatively arranged to detect a magnetic field of the magnet. In some embodiments, the at least one sensor is a Hall effect sensor. In some embodiments, the circuit further comprises a microprocessor, the microprocessor operatively arranged to, based on the detected magnetic field, determine a length of the line extended from the coil or the shaft, in an extended state. In some embodiments, the circuit further comprises a microprocessor, the microprocessor operatively arranged to, based on the detected magnetic field, determine a number of revolutions of the shaft. In some embodiments, the circuit comprises a wireless power transmission receiver operatively arranged to convert received radio frequency (RF) signals to direct current (DC) power. In some embodiments, the retractable securement assembly further comprises a gear non-rotatably connected to the shaft and including a plurality of teeth, and a pawl pivotably connected to the frame and operatively arranged to engage the teeth to prevent rotation of the shaft.

According to aspects illustrated herein, there is provided a method for monitoring a plurality of wheelchair securement assemblies in a vehicle, comprising receiving, by one or more computer processors, a first input from a first wheelchair securement assembly of the plurality of wheelchair securement assemblies, based on the first input, determining, by the one or more computer processors, that a space in the vehicle is occupied, and determining, by the one or more computer processors, if the first wheelchair securement assembly of the space is properly secured.

In some embodiments, the step of determining if the first wheelchair securement assembly of the space is properly secured comprises determining, by the one or more computer processors, that the first wheelchair securement assembly is not properly secured, and indicating, by the one or more computer processors, an error. In some embodiments, the step of determining if the first wheelchair securement assembly of the space is properly secured comprises determining, by the one or more computer processors, that the first wheelchair securement assembly is properly secured, and indicating, by the one or more computer processors, that the first wheelchair securement assembly is properly secured. In some embodiments, the method further comprises logging, by the one or more computer processors, information about the properly secured first wheelchair securement assembly. In some embodiments, the method further comprises, after the step of determining that the space in the vehicle is occupied, receiving, by the one or more computer processors, a second input. In some embodiments, the step of determining if the first wheelchair securement assembly is properly secured comprises based on the second input, determining, by the one or more computer processors, if the first wheelchair securement assembly is properly secured. In some embodiments, the step of receiving the first input comprises receiving, by the one or more computer processors, a first signal from a circuit of the first wheelchair securement assembly. In some embodiments, the step of receiving the second input comprises receiving, by the one or more computer processors, a second signal from the first wheelchair securement assembly. In some embodiments, the step of determining if the space in the vehicle is occupied comprises comparing, by the one or more computer processors, the first input to a predetermined amount. In some embodiments, the first wheelchair securement assembly comprises a retractable line forming a coil, and the first input is received from a sensor operatively arranged to detect an amount of line extended from the coil. In some embodiments, the step of determining if the securement assembly of the seat and/or space is properly secured comprises determining, by the one or more computer processors, that the securement assembly is not properly secured, and indicating, by the one or more computer processors, a status.

In some embodiments, the method further comprises receiving, by one or more computer processors, a second input from a second wheelchair securement assembly of the plurality of wheelchair securement assemblies, receiving, by one or more computer processors, a third input from a third wheelchair securement assembly of the plurality of wheelchair securement assemblies, receiving, by one or more computer processors, a fourth input from a fourth wheelchair securement assembly of the plurality of wheelchair securement assemblies, based on the first, second, third, and fourth inputs, determining, by the one or more computer processors, that the space in the vehicle is occupied, and determining, by the one or more computer processors, if the first, second, third, and fourth wheelchair securement assemblies of the space are properly secured.

According to aspects illustrated herein, there is provided a system for monitoring a securement assembly in a vehicle, comprising a radio frequency (RF) energy transmitter, a frame, a shaft rotatably connected to the frame, the shaft including a first end and a second end, a line connected to the shaft and arranged to form a coil around the shaft in a fully retracted state, an electronics assembly, comprising a plate non-rotatably connected to the second end and including a plurality of magnets, and a circuit including one or more sensors operatively to detect a magnetic field of the magnets, and a RF receiver module operatively arranged to receive wirelessly transmitted RF energy from the RF energy transmitter and convert the RF energy into direct current (DC) power, wherein the circuit is operatively to transmit information to a remote location, one or more computer processors, and program instructions stored on a computer readable storage media for execution by at least one of the one or more computer processors, the program instructions comprising program instructions to receive a first input from the one or more sensors, program instructions to, based on the first input, determine that a seat and/or a space in the vehicle is occupied, program instructions to receive a second input from the one or more sensors, and program instructions to, based on the first and/or second input, determine if the securement assembly of the seat and/or space is properly secured.

According to aspects illustrated herein, there is provided a retractable securement assembly, comprising a shaft biased in a first circumferential direction, a line connected to the shaft, the line including a connector and forming a coil around the shaft in a fully retracted state, the coil comprising a radius, and at least one sensor operatively arranged to retrieve information about the shaft, line, and/or coil, and send the information to a remote location.

In some embodiments, the at least one sensor comprises a first sensor operatively arranged to measure a length of the line extended from the coil or shaft, in an extended state. In some embodiments, the at least one sensor is operatively arranged to measure the radius. In some embodiments, the at least one sensor is operatively arranged to measure a radial distance between the at least one sensor and an outer radial portion of the coil. In some embodiments, the at least one sensor is operatively arranged to measure revolutions of the shaft. In some embodiments, the at least one sensor further comprises a second sensor operatively arranged to measure a radial distance between the second sensor and an outer radial portion of the coil. In some embodiments, the at least one sensor further comprises a third sensor operatively arranged to measure revolutions of the shaft.

According to aspects illustrated herein, there is provided a method for monitoring a securement assembly in a vehicle, comprising receiving, by one or more computer processors, a first input, based on the first input, determining, by the one or more computer processors, that a seat and/or space in the vehicle is occupied, and determining, by the one or more computer processors, if the securement assembly of the seat and/or space is properly secured.

In some embodiments, the step of determining if the securement assembly of the seat and/or space is properly secured comprises determining, by the one or more computer processors, that the securement assembly is not properly secured, and indicating, by the one or more computer processors, an error. In some embodiments, the step of determining if the securement assembly of the seat and/or space is properly secured comprises determining, by the one or more computer processors, that the securement assembly is properly secured, and indicating, by the one or more computer processors, that the securement assembly is properly secured. In some embodiments, the method further comprises logging, by the one or more computer processors, information about the properly secured securement assembly. In some embodiments, the method further comprises, after the step of determining that the seat and/or space in the vehicle is occupied receiving, by the one or more computer processors, a second input. In some embodiments, the step of determining if the securement assembly is properly secured comprises based on the second input, determining, by the one or more computer processors, if the securement assembly is properly secured. In some embodiments, the step of receiving the first input comprises receiving, by the one or more computer processors, a first signal from a seat detection device and/or the securement assembly. In some embodiments, the step of receiving the second input comprises receiving, by the one or more computer processors, a second signal from the securement assembly. In some embodiments, the step of determining if the seat and/or space in the vehicle is occupied comprises comparing, by the one or more computer processors, the first input to a predetermined amount. In some embodiments, the securement assembly comprises a retractable line forming a coil, and the first input is received from a sensor operatively arranged to detect a radius of the coil. In some embodiments, the securement assembly comprises a retractable line forming a coil, and the first input is received from a sensor operatively arranged to detect an amount of line extended from the coil. In some embodiments, the step of determining if the securement assembly of the seat and/or space is properly secured comprises determining, by the one or more computer processors, that the securement assembly is not properly secured, and indicating, by the one or more computer processors, a status.

According to aspects illustrated herein, there is provided a system for monitoring a securement assembly in a vehicle, comprising one or more computer processors, one or more sensors, program instructions stored on the computer readable storage media for execution by at least one of the one or more computer processors, the program instructions comprising program instructions to receive a first input from the one or more sensors, program instructions to, based on the first input, determine that a seat and/or space in the vehicle is occupied, program instructions to receive a second input from the one or more sensors, and program instructions to, based on the first and/or second input, determine if the securement assembly of the seat and/or space is properly secured.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and, relative rotation between the elements is not possible. Radial and/or axial movement of non-rotatably connected elements with respect to each other is possible, but not required. By "rotatably connected" elements, we mean that: the elements are rotatable with respect to each other.

Figure 1A:
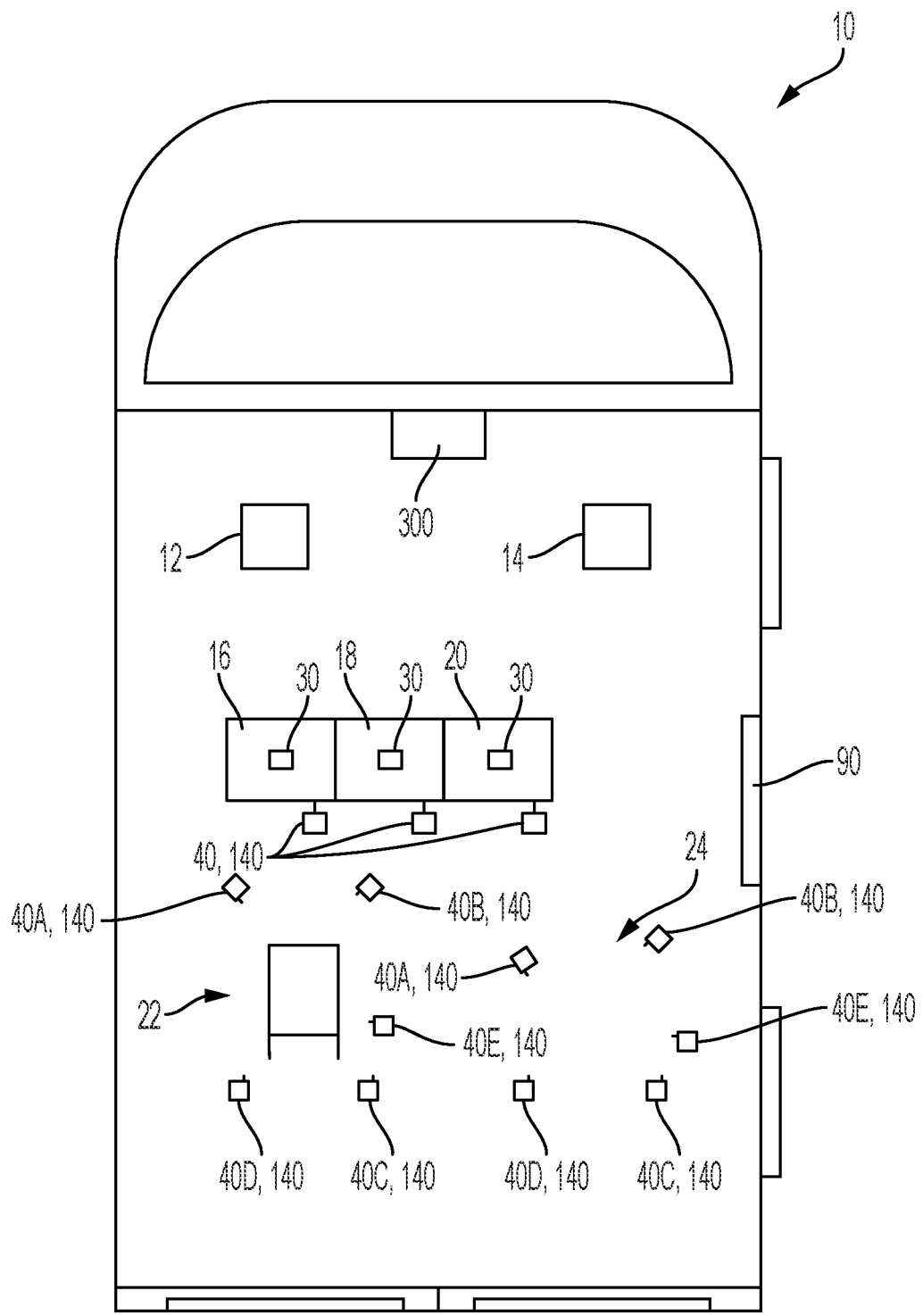
FIG. 1A is a schematic view of a vehicle including securement assemblies in an unsecured state.
Figure 1B:
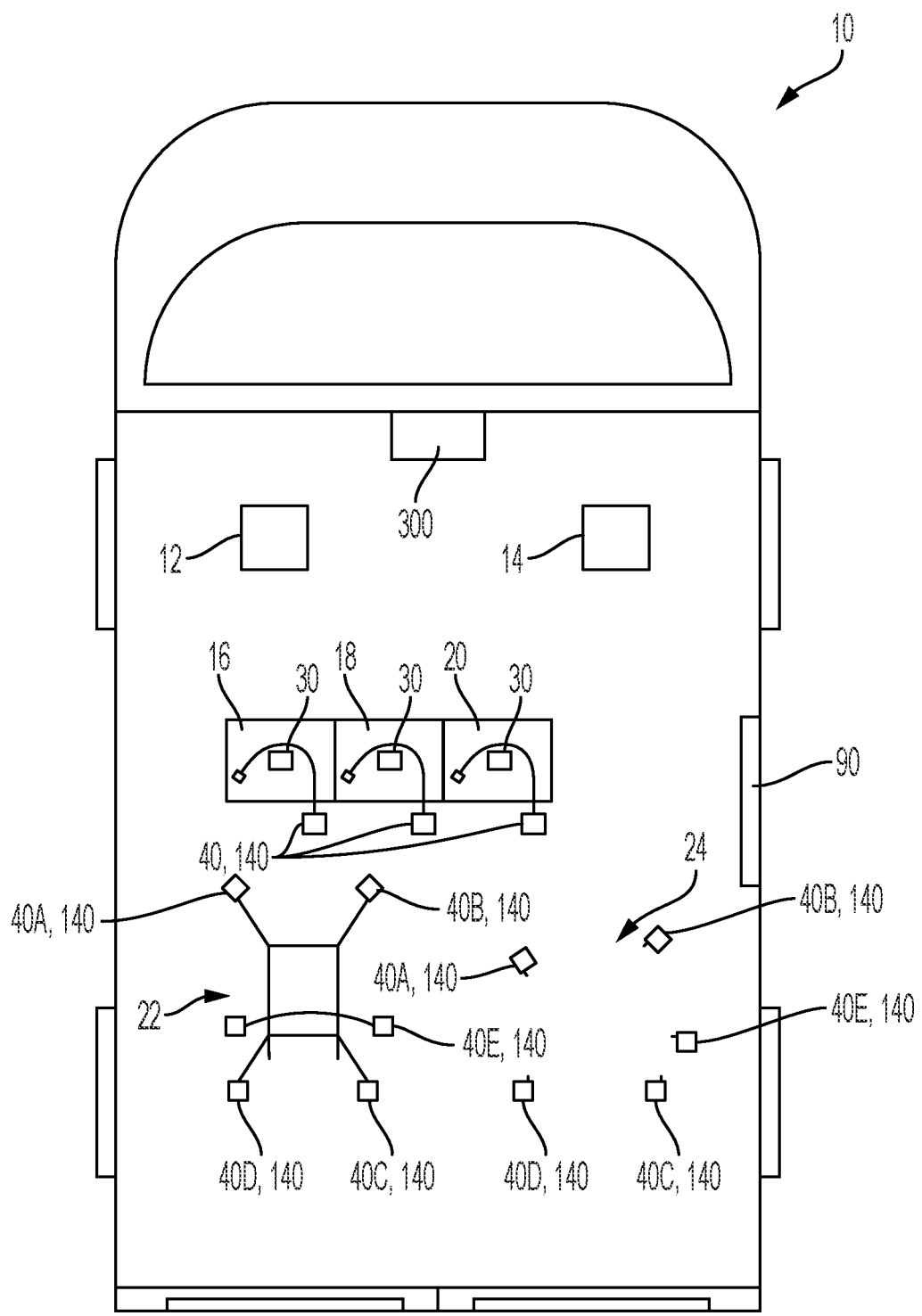
FIG. 1B is a schematic view of the vehicle shown in FIG. 1A, with the securement assemblies in a secured state.

Referring now to the figures, FIG. 1A is a schematic view of vehicle or securement assembly monitoring system 10 including securement assemblies 40, 40A-E, 140, in an unsecured state. FIG. 1B is a schematic view of vehicle 10 with the securement assemblies 40, 40A-E, 140, in a secured state. Vehicle 10 generally comprises one or more seats, for example, driver seat 12, front passenger seat 14, and rear passenger seats 16, 18, and 20, one or more spaces, for example, handicap passenger spaces 22 and 24, and computing device 300. Vehicle 10 comprises a handicap accessible van layout; however, it should be appreciated that the securement assembly monitoring system of the present disclosure may be implemented in any vehicle that utilizes securement devices, for example, a car, truck, motorcycle (with sidecar), train, bus, airplane, sport utility vehicle (SUV), boat, etc. The following description should be read in view of FIGS. 1A-B.

As previously described, vehicle 10 comprises rear passenger seats 16, 18, and 20. It should be appreciated that, while seats 16, 18, and 20 are arranged in a bench configuration, in some embodiments seats 16, 18, and 20 may be arranged as bucket seats. Furthermore, it should be appreciated that while FIGS. 1A-B only show three rear passenger seats, in some embodiments, vehicle 10 may comprise one or more rear passenger seats. Each of seats 16, 18, and 20 comprises at least one securement assembly 40, 140. As is known in the art, securement assembly 40, 140 is operatively arranged to secure a passenger in the seat (i.e., a seat belt). Securement assembly 40, 140 is operatively arranged to communicate with computing device 300 via either a wired connection or a wireless connection, as will be described in greater detail below.

In some embodiments, and as shown, each of seats 16, 18, and 20 further comprises at least one seat detection device 30. Seat detection device or sensor 30 is operatively arranged to detect if a passenger is present in the respective seat. Seat detection device 30, also known as occupant detection device or sensor, detects the presence of a seat occupant. In some embodiments, seat detection device 30 also detects the size and positioning of the seat occupant. Seat detection device 30 is operatively arranged to communicate with computing device 300 via either a wired connection or a wireless connection.

In some embodiments, seat detection device 30 comprises a sensor, a transmission device, and a power source. The transmission device is arranged to send a signal to a receiver in computing device 300 or at another remote location (not shown) indicating that an occupant is present in the respective seat. The transmission device generally comprises a transmitter. The power source may comprise a battery or any combination of multiple batteries, or a wired connection to the alternator, etc. that can produce sufficient voltage to power the components and circuitry in seat detection device 30 (i.e., the sensor and transmitter). In some embodiments, the transmitter includes an antenna and is operatively arranged to communicate with a remote receiver (e.g., a computer, a smartphone, an iPad® tablet computer, a Surface® computer, or any other computing device) and can be utilized to send/receive a wireless signal/communication. It should be appreciated that "wireless communication(s)" as used herein is intended to mean Radio Frequency Identification (RFID) communication, Bluetooth® protocols, Near field Communication (NFC), Near Field Magnetic Inductance Communication (NFMIC), Wi-Fi, LTE, Airdrop® communication, or any other wireless protocol sufficient to communicate with the remote receiver. The sensor is any device, module, or subsystem capable of detecting that an occupant is present in the respective seat and sending that information to the transmitter to be transmitted to a remote receiver (i.e., computing device 300). It should be appreciated that the sensor of seat detection device 30 could be embodied as a pressure sensor.

In an example embodiment, and as previously discussed, seat detection device 30 is used to send a signal to computing device 300, namely, securement assembly verification program 130, as will be described in greater detail below, indicating that an occupant is present (i.e., sitting) in respective seat 16, 18, 20. In addition, seat detection device 30 can be used to send a signal indicating not only that an occupant is present, but also the weight of the occupant and position of the occupant in the seat, so that securement assembly verification program 130 may account for the approximate size of the occupant. The size of the occupant may be important to determine the length of the webbing of the strap or belt or webbing that is needed to properly secure the occupant in the seat (i.e., the belt portion of securement assembly 40, 140 must go around the front of the occupant as shown in FIG. 1B), as will be described in greater detail below.

In an example embodiment, seat detection device 30 further comprises a microcontroller. The microcontroller may include a memory element and a processing unit. The memory element is capable of storing a set of non-transitory computer readable instructions. The processing unit is arranged to execute the set of non-transitory computer readable instructions.

In an example embodiment, the microcontroller is programmed to perform the following steps: receive an indication from the sensor that an occupant is present in the seat; and, send a signal to computing device 300 or a remote receiver via the transmitter indicating that an occupant is present in the seat.

In an example embodiment, the microcontroller is programmed to perform the following steps: receive an indication from the sensor that an occupant is present in the seat; determine a weight of the occupant; and, send a signal to computing device 300 or a remote receiver via the transmitter indicating that an occupant is present in the seat and the weight of the occupant.

In an example embodiment, the microcontroller is programmed to perform the following steps: receive an indication from the sensor that an occupant is present in the seat; determine a position of the occupant on the seat; and, send a signal to computing device 300 or a remote receiver via the transmitter indicating that an occupant is present in the seat and the position of the occupant on the seat.

In an example embodiment, the microcontroller is programmed to perform the following steps: receive an indication from the sensor that an occupant is present in the seat; determine a weight of the occupant; determine a position of the occupant on the seat; and, send a signal to computing device 300 or a remote receiver via the transmitter indicating that an occupant is present in the seat, the weight of the occupant, and the position of the occupant on the seat.

As previously described, vehicle 10 comprises spaces 22 and 24. It should be appreciated that, while FIGS. 1A-B only show two spaces, in some embodiments, vehicle 10 may comprise one or more rear passenger seats. It should also be appreciated that while the present disclosure discusses spaces 22 and 24 being arranged to secure wheelchairs within vehicle 10, spaces 22 and 24 can also be used to secure cargo or any other object that needs to be strapped down or secured to the floor of vehicle 10. Each of spaces 22 and 24 comprises at least one securement assembly 40, 140. As is known in the art, securement assembly 40, 140 is operatively arranged to secure a wheelchair to the floor of vehicle 10 (i.e., a wheelchair tie down) or secure a wheelchair occupant in a secured wheelchair (i.e., wheelchair seat belt). Each of spaces 22 and 24 may comprise one or more securement assemblies. In some embodiments, and as shown, each of spaces 22 and 24 comprises securement assemblies 40A-E, 140. Securement assemblies 40A-D, 140 are operatively arranged as wheelchair tie downs to secure the wheelchair to the floor of vehicle. Securement assembly 40E, 140 is operatively arranged as a wheelchair seatbelt to secure the occupant to the secured wheelchair. As previously described, securement assemblies 40A-E, 140 are operatively arranged to communicate with computing device 300 via either a wired connection or a wireless connection, as will be described in greater detail below. It should be appreciated that securement assemblies 40 and 40A-E are substantially the same.

In some embodiments, vehicle 10 further comprises radio frequency (RF) transmitter 90. RF transmitter 90 is operatively arranged to transmit power wirelessly to a receiver arranged on securement assembly 140. In some embodiments, RF transmitter 90 is a POWERCASTER® transmitter that transmits power to a receiver, for example a POW- ERHARVESTER® receiver chip or module, arranged on securement assembly 140. As will be described in greater detail below, securement assemblies 140 receive power wirelessly from RF transmitter 90. RF transmitter 90 receives power from a battery of vehicle 10, an alternator of vehicle 10, and/or shore power when vehicle 10 is parked.

Figure 2A:
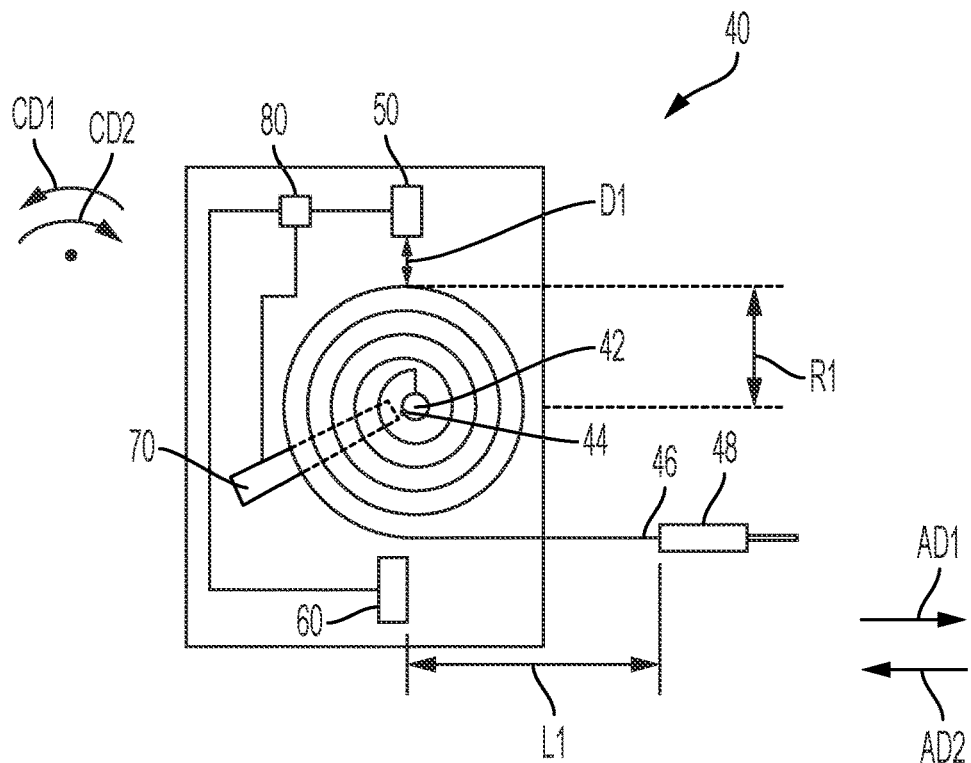
FIG. 2A is a schematic view of a securement assembly in a fully retracted state.
Figure 2B:
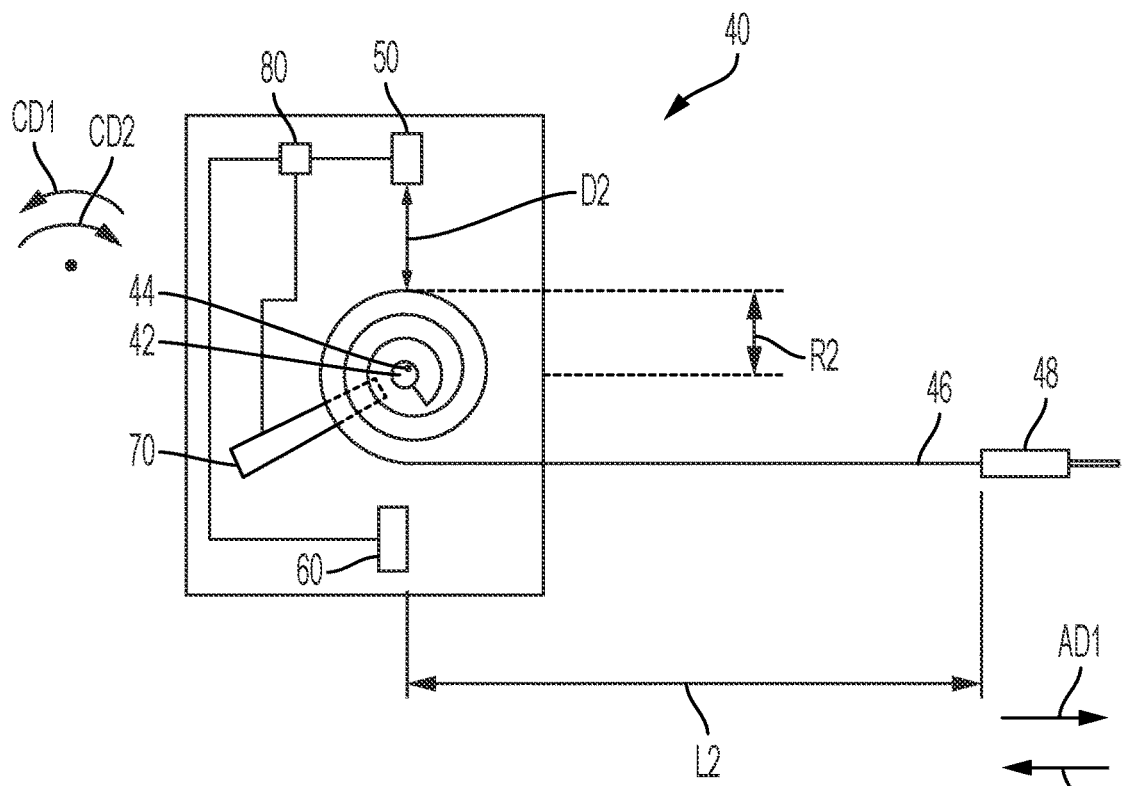
FIG. 2B is a schematic view of the securement assembly shown in FIG. 2A, in an extended state.

FIG. 2A is a schematic view of securement assembly 40, in a fully retracted state. FIG. 2B is a schematic view of securement assembly 40, in an extended state. Securement assembly 40 generally comprises shaft 42, line (or strap or webbing or belt) 46 connected at a first end to shaft 42, connector 48 connected to a second end line 46, and one or more sensors, for example, sensors 50, 60, and 70. It should be appreciated that, while FIGS. 2A-B illustrate securement assembly 40, such schematic applies and illustrates each of securement assemblies 40A-E as well since, as previously described, securement assemblies 40 and 40A-E are substantially the same. Thus, FIGS. 2A-B illustrate a schematic view of each of securement assemblies 40, 40A, 40B, 40C, 40D, and 40E. The following description should be read in view of FIGS. 1A-2B.

In some embodiments, shaft 42 is biased (e.g., by a spring) in circumferential direction CD2 so as to retract line 46 when not in use. When an occupant wishes to utilize securement assembly 40, line 46, specifically connector 48, is pulled in axial direction AD1 which causes shaft 42 to displace in circumferential direction CD1. When the occupant wishes to be released from the seat or space, connector 48 is disconnected and shaft 42 rotates in circumferential direction CD2 causing connector 48 and line 46 to displace back in axial direction AD2. As is known in the art, securement assembly 40 may further comprise a brake or a mechanism which prevents rotation of shaft 42 in the event that vehicle 10 abruptly stops or the driver applies the brakes. Such a feature prevents line 46 from unwinding in order to prevent the occupant from being thrown from the seat.

Connector 48 is any connection mechanism suitable for connecting line 46 and securing an object in vehicle 10. For example, for seats 16, 18, and 20, connector 48 may comprise a male buckle that connects to a female buckle (i.e., a standard vehicle seat belt). For spaces 22 and 24, connector 48 may comprise a hook or other suitable connector for tying down a wheelchair (i.e., for securement assemblies 40A-D). Also for spaces 22 and 24, specifically for connector assemblies 40E, connector 48 may comprise a male buckle that connects to a female buckle. However, it should be appreciated that any connector suitable for properly securing a passenger and/or a wheelchair (or other cargo) to vehicle 10 may be used.

Sensors 50, 60, and 70 are operatively arranged to detect how much line 46 is being used. It should be appreciated that vehicle 10 may further comprise buckle sensors that detect when a male buckle component (i.e., connector 48) is properly connected to a female buckle component. Sensor 50 generally detects the distance to the coiled line 46. Specifically, and as shown, sensor 50 detects distance D1. The coiled portion of line 46 in a fully retracted position, as shown in FIG. 2A, is measured as radius R1. As shown in FIG. 2B, line 46 is extended in axial direction AD1 by a distance of length L2 minus length L1. This extension unwinds the coiled line 46 to radius R2. Sensor 50 now detects distance D2 which is greater than distance D1, thereby indicating that line 46 is being used (i.e., is unwinded or extended). When line 46 is no longer needed, connector 48 is disconnected and line 46 retracts and rewinds onto shaft 42 thereby increasing the radius of the coiled line and decreasing the distance between sensor 50 to the coiled line. In some embodiments, sensor 50 is an ultrasonic sensor that measures the distance to the coiled line 46 at any given time. In some embodiments, sensor 50 is a proximity sensor that detects the proximity to (distance to) the coiled line 46. Sensor 50 is operatively arranged to send information (i.e., the distance to coiled line 46) via wired connection or wirelessly to transducer 80, as will be described in greater detail below.

Sensor 60 generally detects the amount of line 46 that has been extended. Specifically, as line 46 is displaced in axial direction AD1, sensor 60 measures the length of the line 46 that passes thereby. As shown in FIG. 2A, connector 48 extends from sensor 60 in axial direction AD1 by length L1. In FIG. 2B, connector 48 extends from sensor 60 in axial direction AD1 by length L2, which is greater than length L1. Thus, sensor 60 would detect that line 46 has been extended a distance of length L2 minus length L1. In some embodiments, length L1 is zero or calibrated as zero. In some embodiments, sensor 60 also detects how much of line 46 has passed by in direction AD2, such that this distance may be subtracted from the amount of line 46 that has passed by in direction AD1. In some embodiments, sensor 60 is a displacement sensor or optical sensor (e.g., a laser or optical sensor such as in a computer mouse) that detects how much of line 46 has been extended (i.e., the length of line 46 that has been extended from shaft 42). Sensor 60 is operatively arranged to send information (i.e., the length of line 46 extended from shaft 42) via wired connection or wirelessly to transducer 80, as will be described in greater detail below.

Sensor 70 generally detects the number of revolutions that shaft 42 had incurred. Specifically, as line 46 is displaced in axial direction AD1, shaft 42 rotates in circumferential direction CD1. The number of rotations of shaft 42 in circumferential direction CD1 directly corresponds with the amount of line 46 that has been extended (and is in use). Sensor 70 also measures the number of revolutions that shaft 42 incurs in circumferential direction CD2. In some embodiments, and as shown, shaft 42 comprises marker 44 and sensor 70 detects the number of times marker 44 passes thereby in a first circumferential direction CD1 (for extension of line 46) and in a second circumferential direction CD2 (for retraction of line 46). In some embodiments, sensor 70 is a rate per minute (RPM) sensor, a tachometer, an optical sensor, a variable reluctance (VR) speed sensor, or any other suitable sensor operatively arranged to detect how many revolutions shaft 42 has incurred in circumferential directions CD1 and CD2. Sensor 70 is operatively arranged to send information (i.e., the number of revolutions of shaft 42) via wired connection or wirelessly to transducer 80, as will be described in greater detail below.

Transducer 80 is generally a device that receives signals from sensors 50, 60, and/or 70 and transmits the data therein to a remote location via wired connection or wirelessly, for example, computing device 300. As such, transducer 80 comprises at least a receiver or receiving component for receiving signals from sensor 50, 60, and 70 and a transmission device. The transmission device is arranged to send a signal to a receiver in computing device 300 or at another remote location (not shown), for example, indicating the distance to the coiled line 46 (i.e., the radius of the coiled line 46), the length of extended line 46, and/or the number of revolutions incurred by shaft 42, etc. The transmission device generally comprises a transmitter. In some embodiments securement assembly 40 further comprises a power source. The power source may comprise a battery or any combination of multiple batteries, or a wired connection to the alternator, etc. that can produce sufficient voltage to power the components and circuitry in securement assembly 40 (i.e., sensor 50, 60, 70 and transducer 80). In some embodiments, the transmitter component of transducer 80 includes an antenna and is operatively arranged to communicate with a remote receiver (e.g., a computer, a smartphone, an iPad® tablet computer, a Surface® computer, or any other computing device) and can be utilized to send/receive a wireless signal/communication. It should be appreciated that "wireless communication(s)" as used herein is intended to mean Radio Frequency Identification (RFID) communication, Bluetooth® protocols, Near field Communication (NFC), Near Field Magnetic Inductance Communication (NFMIC), Wi-Fi, LTE, Airdrop® communication, or any other wireless protocol sufficient to communicate with the remote receiver.

In an example embodiment, and as previously discussed, securement assembly 40 is used to send a signal to computing device 300, namely, securement assembly verification program 130, as will be described in greater detail below, generally indicating the amount of line 46 that is in use (i.e., has been extended from the coil).

In an example embodiment, securement assembly 40 further comprises a microcontroller. The microcontroller may include a memory element and a processing unit. The memory element is capable of storing a set of non-transitory computer readable instructions. The processing unit is arranged to execute the set of non-transitory computer readable instructions.

In an example embodiment, the microcontroller is programmed to perform the following steps: receive information from sensor 50 that the coiled line 46 has a radius R2 (a decrease from radius R1); receive information from sensor 60 that line 46 has been extended from shaft 42 a distance of length L2 minus length L1; and/or receive information from sensor 70 that shaft 42 has completed a number of revolutions (i.e., a number of revolutions in circumferential direction CD2 minus a number revolutions in circumferential direction CD1); and, send a signal to computing device 300 or a remote receiver via transducer 80 indicating such data.

Figure 3:
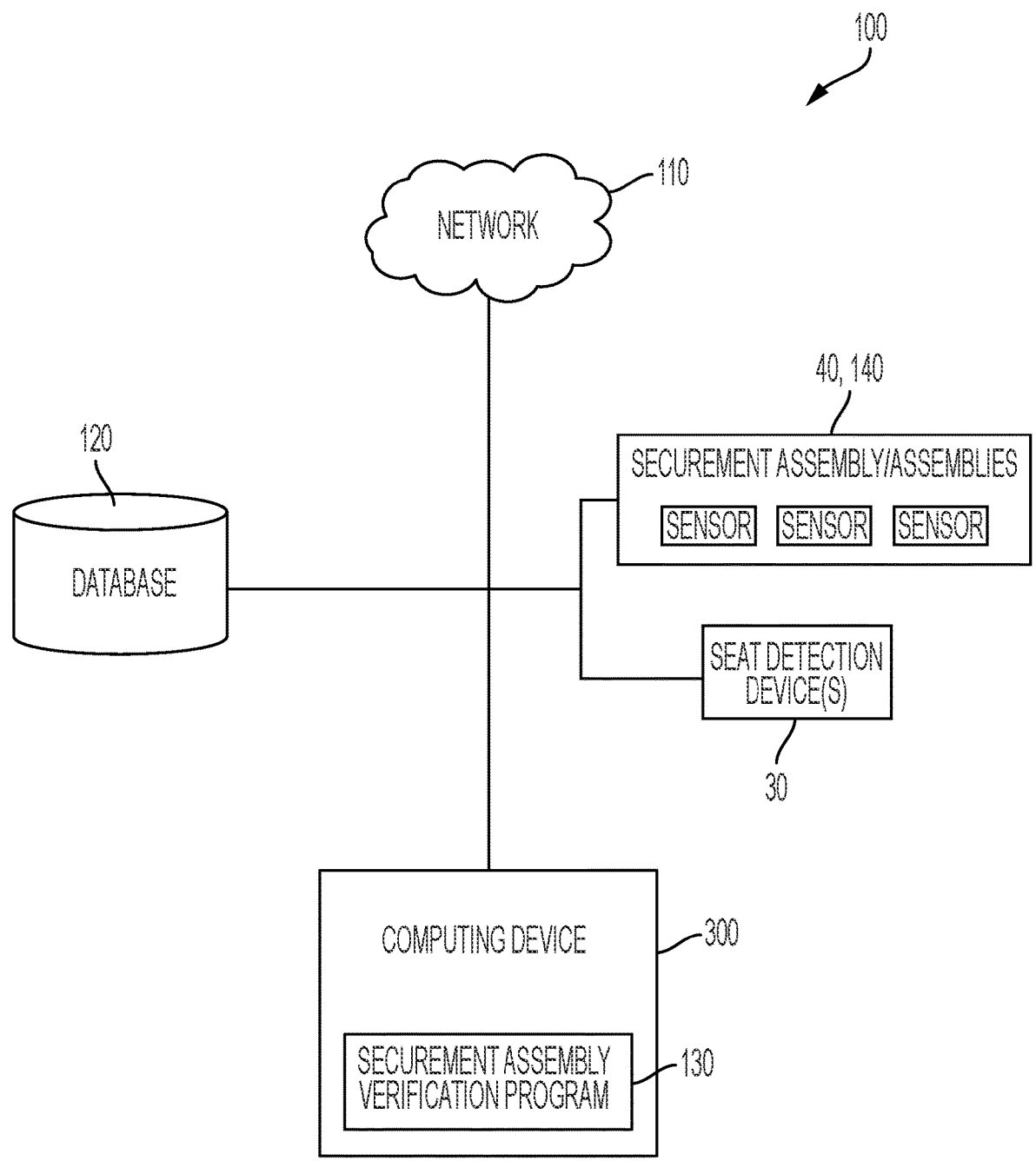
FIG. 3 is a functional block diagram illustrating an environment, in accordance with some embodiments of the present disclosure.

FIG. 3 is a functional block diagram illustrating an environment, generally designated 100, in accordance with one embodiment of the present disclosure. FIG. 3 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, securement assembly monitoring environment 100 includes computing device 300, database 120, one or more securement assemblies 40, 140, and one or more seat detection devices 30 all of which are connected to network 110.

Network 110 can be, for example, a local area network (LAN), a wide area network (WAN) such as the Internet, or a combination of the two, and can include wired, wireless, or fiber optic connections.

Computing device 300 may be a hardware device that monitors the status of securement assemblies 40, 140 using securement assembly verification program 130. Computing device 300 is capable of communicating with network 110, database 120, seat detection devices 30, and securement assemblies 40, 140. In some embodiments, computing device 300 may include a computer. In some embodiments, computing device 300 may include internal and external hardware components, as depicted and described in further detail with respect to FIG. 7. In some embodiments, securement assembly verification program 130 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 7.

Securement assembly verification program 130 receives inputs, for example, from seat detection devices 30, securement assemblies 40, 140, or manually from a user. Securement assembly verification program 130 uses the inputs received to verify if passengers are present in the vehicle and if securement assemblies are properly secured (i.e., the passengers are properly secured by the securement assemblies). Securement assembly verification program 130 can generally include any software capable of accurately verifying the status of securement assemblies 40, 140 within vehicle 10, logging data about the status of securement assemblies 40, 140, and communicating with securement assemblies 40, 140, seat detection devices 30, database 120, and network 110.

Database 120 is a central storage for logging data. Database 120 can be implemented using any non-volatile storage medium known in the art. For example, authentication database can be implemented with a tape library, optical library, one or more independent hard disk drives, or multiple hard disk drives in a redundant array of independent disks (RAID). In some embodiments, database 120 is used to store data, for example, the time that securement assembly 40, 140 is properly secured, and the length of time that securement assembly 40, 140 is properly secured, as described in greater detail below.

Figure 4:
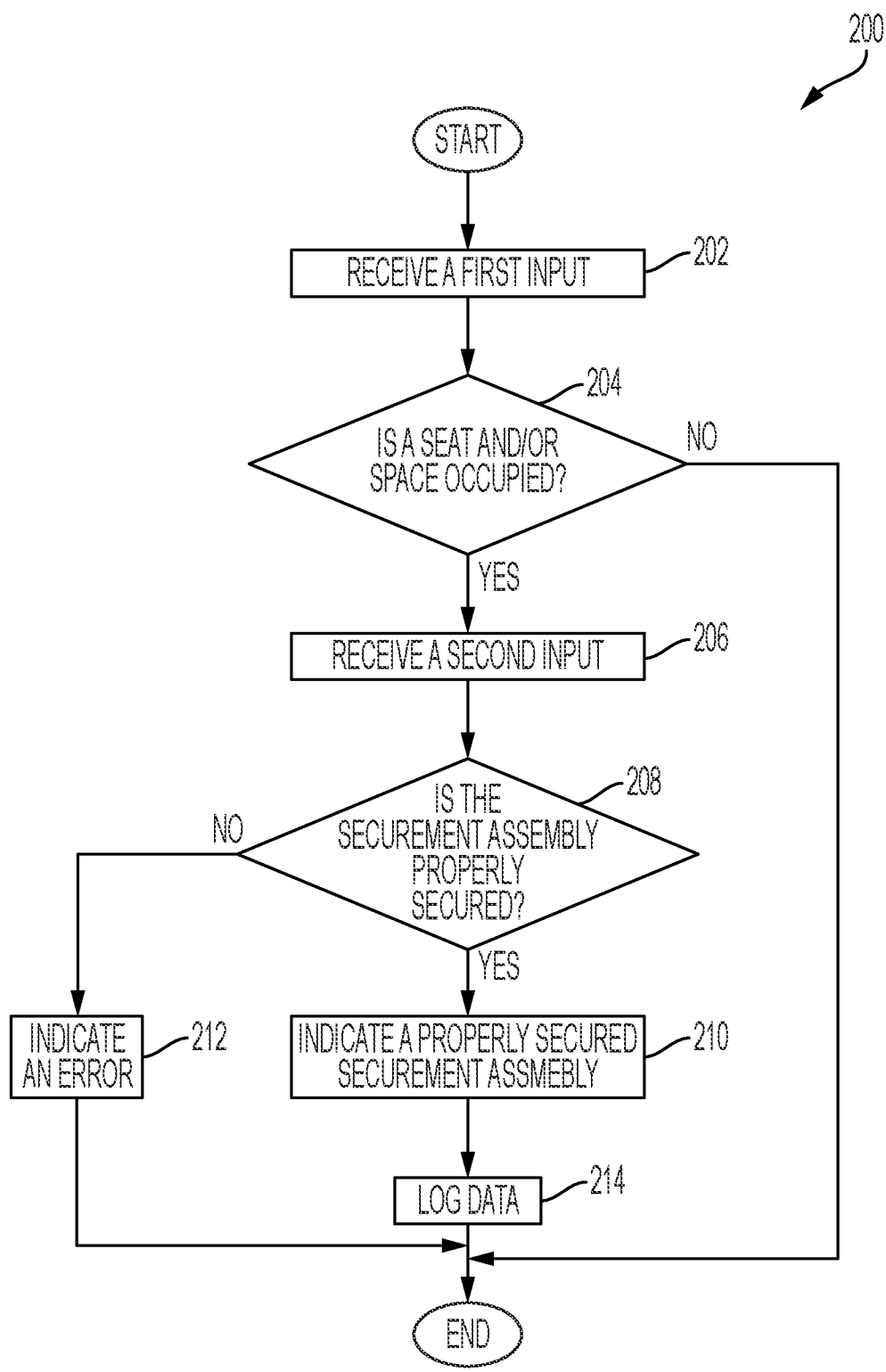
FIG. 4 is a flow chart depicting operational steps for monitoring securement assemblies within a vehicle.

FIG. 4 shows flow chart 200 depicting operational steps for monitoring securement assemblies 40, 140 within vehicle 10.

In step 202, securement assembly verification program 130 receives a first input. In some embodiments, the first input is from seat detection device 30 indicating that a mass is being applied to a seat. In some embodiments, the first input is from securement assembly 40, 40A-E, 140 indicating that line 46, 158 is active (i.e., line 46, 158 is being extended or displaced from its fully retracted state), which may indicate that an occupant is present in the seat or that a wheelchair or wheelchair occupant is being secured to vehicle 10.

In step 204, securement assembly verification program 130 determines if a seat or space is occupied by a passenger. For example, if securement assembly verification program 130 receives an input from seat detection device 30 that mass is being applied to seat 16, then securement assembly verification program 130 determines whether that mass is large enough to be a passenger. If the mass applied to seat 16 is greater than a predetermined amount, then securement assembly verification program 130 indicates that a passenger/occupant is present in seat 16 and must be properly secured. In another example, if securement assembly verification program 130 receives an input that line 46, 150 is being extended, securement assembly verification program 130 determines if line 46, 150 has been extended enough to indicate that line 46, 150 is trying to be used for securement purposes. Thus, if line 46, 150 has been extended a distance that is greater than a predetermined amount, then securement assembly verification program 130 indicates that a passenger/occupant, wheelchair, or other cargo is present in that seat or space and must be properly secured.

If, in step 204, securement assembly verification program 130 determines that a passenger/occupant, wheelchair, or other cargo is not present in the seat or space, then the program ends.

If, in step 204, securement assembly verification program 130 determines that a passenger/occupant, wheelchair, or other cargo is present in the seat or space, then in step 206, securement assembly verification program 130 receives a second input from securement assembly 40, 40A-E, 140 indicating how much line 46, 158 has been extended (i.e., how much line 46, 158 is being used). It should be appreciated that in some embodiments, the first input includes such information and thus step 206 is not necessary as an extra step.

In some embodiments, the second input is from transducer 80 transmitting information from sensor 50, indicating the current radius of the coiled line 46. In such embodiments, securement assembly verification program 130 determines if the radius of the coiled line 46 is less than a predetermined amount, which would indicate that enough of line 46 has been extended to properly secure an occupant in the seat or a wheelchair in the space.

In some embodiments, the second input is from transducer 80 transmitting information from sensor 60, indicating the length of line 46 that has been extended from shaft 42 or the coil. In such embodiments, securement assembly verification program 130 determines if the length of line 46 that has been extended from the coil or shaft 42 is greater than a predetermined amount, which would indicate that enough of line 46 has been extended to properly secure an occupant in the seat or a wheelchair in the space.

In some embodiments, the second input is from transducer 80 transmitting information from sensor 70, indicating the number of revolutions incurred by shaft 42. In such embodiments, securement assembly verification program 130 determines if the number of revolutions of shaft 42 (i.e., revolutions of shaft 42 in circumferential direction CD1 minus revolutions of shaft 42 in circumferential direction CD2) is greater than a predetermined amount, which would indicate that enough of line 46 has been extended to properly secure an occupant in the seat or a wheelchair in the space.

In some embodiments, the second input is from transmitter 168 transmitting information from at least one of sensors U1-5, indicating the number of revolutions incurred by shaft 150. In such embodiments, securement assembly verification program 130 determines if the number of revolutions of shaft 150 (i.e., revolutions of shaft 150 in a first circumferential direction minus revolutions of shaft 150 in a second circumferential direction) is greater than a predetermined amount, which would indicate that enough of line 158 has been extended to properly secure an occupant in the seat or a wheelchair in the space.

In some embodiments, securement assembly verification program 130 further determines if a buckle (i.e., connector 48) is properly connected. As previously described, securement assembly 40, 40E, 140 may comprise male buckle component that connects to a female buckle component, and vehicle 10 may comprise sensors and transducers that detect this connection. Therefore, in addition to determining if a sufficient amount of line 46, 158 is extended from the coil, securement assembly verification program 130 also determines if connector 48 is sufficiently connected (i.e., to a female buckle component).

If, in step 208, securement assembly verification program 130 determines that enough of line 46, 158 has been extended to properly secure an occupant in the seat or a wheelchair in the space, then in step 210 securement assembly verification program 130 indicates a properly secured securement assembly (i.e., that securement assembly 40, 40A-E, 140 is properly secured).

If, in step 208, securement assembly verification program 130 determines that not enough of line 46, 158 has been extended to properly secure an occupant in the seat or a wheelchair in the space, then in step 212 securement assembly verification program 130 indicates an error or alert. The error indicated in step 208 alerts the driver or another user that an occupant exists in the seat or space and the line 46, 158 is active, but that not enough of the line 46, 158 is extended to properly secure the occupant. As an example, this error might occur if an occupant (i.e., child) buckles the seat belt behind their back so as to attempt to trick a buckle sensor into believing that the line is properly secured.

In some embodiments, in step 214, securement assembly verification program 130 logs data regarding the properly secured securement assembly. For example, once securement assembly verification program 130 determines that securement assembly 40, 140 is properly secured, the time of proper securement is recorded and stored, for example, in database 120. Additionally, securement assembly verification program 130 may start a timer to record the amount of time that securement assembly 40, 140 is properly secured. Such information may be important for liability reasons, for example, to prove in case of an accident that securement assembly 40, 140 was properly secured during the duration of the transportation or ride. It should be appreciated that, in some embodiments, securement assembly verification program 130 logs the indicated error of step 212. Thus, in such embodiments, in step 214, securement assembly verification program 130 logs an error message of step 212, as well as a properly secured securement assembly of step 210.

Figure 5:
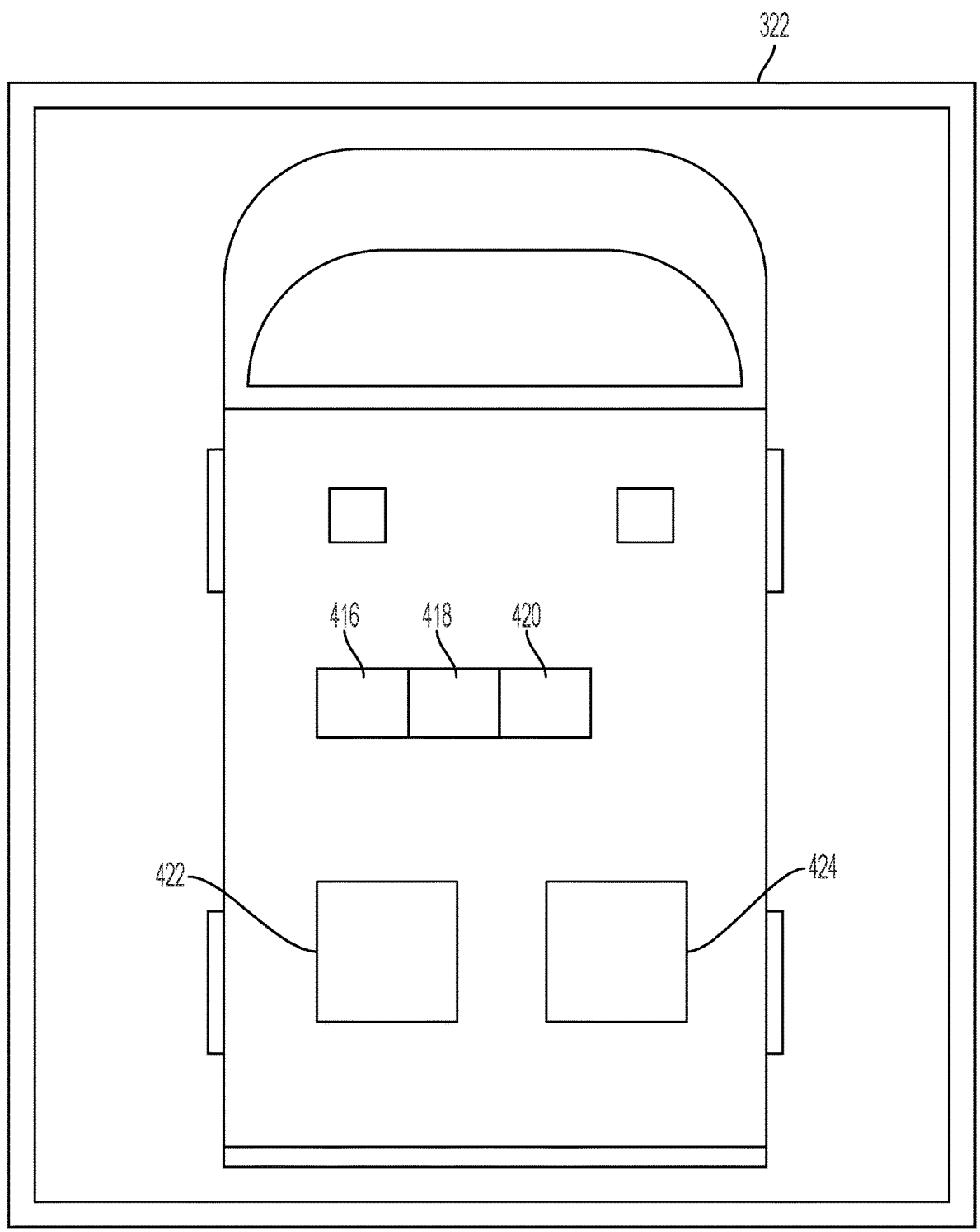
FIG. 5 is a front view of a portion of a display, in accordance with some embodiments of the present disclosure.

FIG. 5 is a front view of a portion of display 322, in accordance with some embodiments of the present disclosure. As shown, display 322 generally comprises section 416, section 418, section 420, section 422, and section 424, which are operatively arranged to indicate to the driver or another user the status of the various seats and spaces within vehicle 10. For example, section 416 corresponds to seat 16, section 418 corresponds to seat 18, section 420 corresponds to seat 20, section 422 corresponds to space 22, and section 424 corresponds to space 24. In some embodiments, the sections have one or more indicators, as described below.

In some embodiments, the sections comprise a first indicator when the seat/space is vacant (i.e., there is no occupant therein). The first indicator may indicate a first color (e.g., clear or no color, purple, etc.), a first symbol, and/or word (e.g., "vacant"). The sections might indicate the first indicator if, in step 204, securement assembly verification program 130 determines that the seat/space is not occupied.

In some embodiments, the sections comprise a second indicator when line 46, 158 is extended but not enough to buckle. The second indicator may indicate a second color (e.g., yellow), a second symbol, and/or a word (e.g., "active"). The sections might indicate the second indicator after securement assembly verification program 130 receives the first input in step 202 (e.g., due to movement of line 46, 158 or mass applied to a seat).

In some embodiments, the sections comprise a third indicator when line 46, 158 is extended and buckled, but not enough of line 46, 158 is extended out to properly secure a passenger (i.e., the length of the extended line 46, 158 would not be enough to wrap around an occupant). The third indicator may indicate a third color (e.g., red), a second symbol, and/or a word (e.g., "error," "caution," "alert," etc.). The sections might indicate the third indicator after securement assembly verification program 130 determines that the securement assembly is not properly secured in step 208, and subsequently indicates an error in step 212.

In some embodiments, the sections comprise a fourth indicator when line 46, 158 is extended, buckled, and enough of line 46, 158 is extended out to fit a passenger. The fourth indicator may indicate a fourth color (e.g., green), a fourth symbol, and/or a word (e.g., "secure," "connected," etc.).

Figure 6:
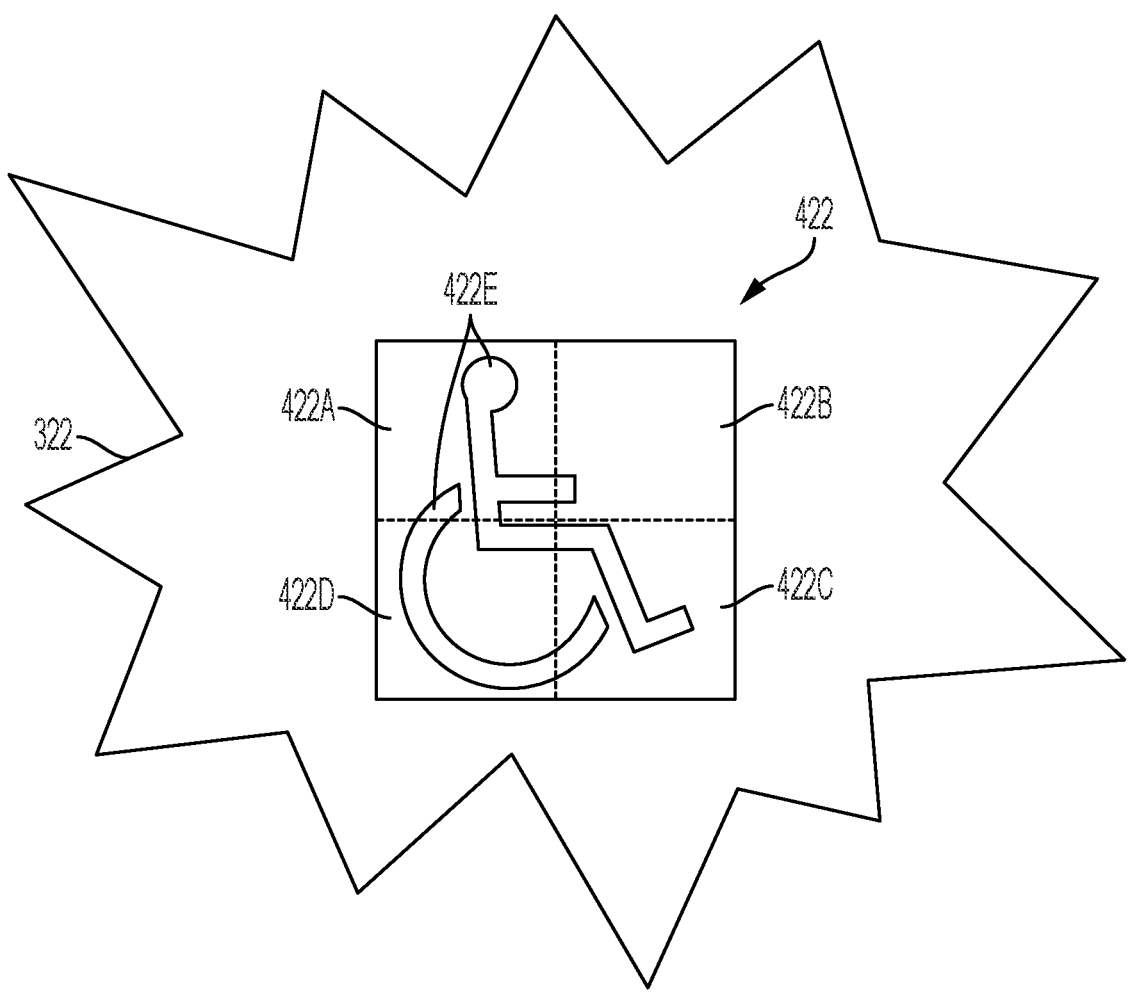
FIG. 6 is a front view of a portion of the display shown in FIG. 5, in accordance with some embodiments of the present disclosure.

FIG. 6 is a front view of a portion of display 322, in accordance with some embodiments of the present disclosure. FIG. 6 shows an example of the indication display for section 422, which represents a wheelchair securement space (i.e., space 22) in vehicle 10. In some embodiments, section 422 comprises portions 422A-E. Portion 422A corresponds to securement assembly 40A, 140, portion 422B corresponds to securement assembly 40B, 140, portion 422C corresponds to securement assembly 40C, 140, portion 422D corresponds to securement assembly 40D, 140, and portion 422E corresponds to securement assembly 40E, 140. Each of portions 422A-E display the various color, symbol, and/or word indicators to indicate the state of securement assemblies 40A-E, 140, respectively, as described above. Thus, portions 422A-D indicate the state of the wheelchair tie downs (i.e., securement devices 40A-D, 140) and portion 422E indicates the state of the wheelchair seatbelt (i.e., securement device 40E, 140).

Figure 7:
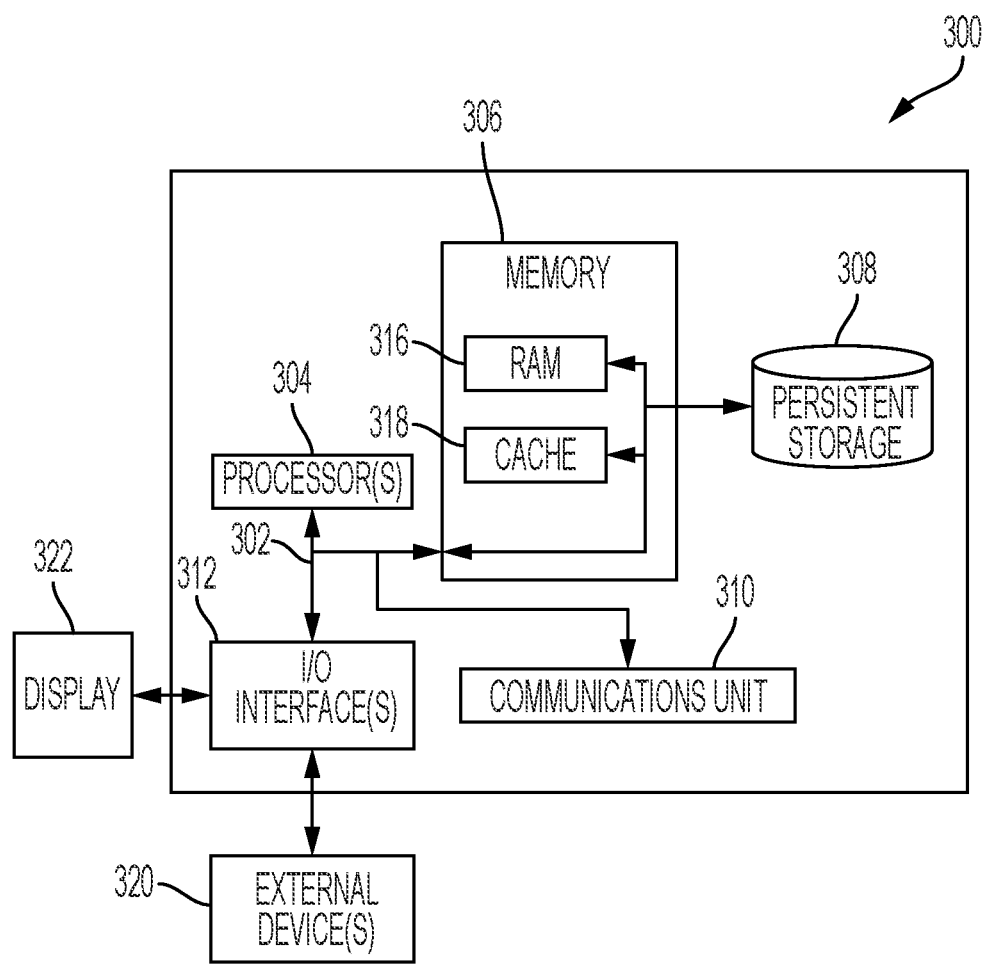
FIG. 7 is a block diagram of internal and external components of a computer system, in accordance with some embodiments of the present disclosure.

FIG. 7 is a block diagram of internal and external components of computing device 300, which is representative of the computing device of FIG. 3, in accordance with an embodiment of the present disclosure. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 300 includes communications fabric 302, which provides for communications between one or more processing units 304, memory 306, persistent storage 308, communications unit 310, and one or more input/output (I/O) interfaces 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310 provides for communications with other computer systems or devices via a network. In this exemplary embodiment, communications unit 310 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 300 through communications unit 310 (i.e., via the Internet, a local area network, or other wide area network). From communications unit 310, the software and data can be loaded onto persistent storage 308.

One or more I/O interfaces 312 allow for input and output of data with other devices that may be connected to computing device 300. For example, I/O interface 312 can provide a connection to one or more external devices 320 such as a keyboard, computer mouse, touch screen, virtual keyboard, touch pad, pointing device, or other human interface devices. External devices 320 can also include portable computer readable storage media such as, for example, thumb drives, portable optical or magnetic disks, and memory cards. I/O interface 312 also connects to display 322.

Display 322 provides a mechanism to display data to a user and can be, for example, a computer monitor. Display 322 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8A:
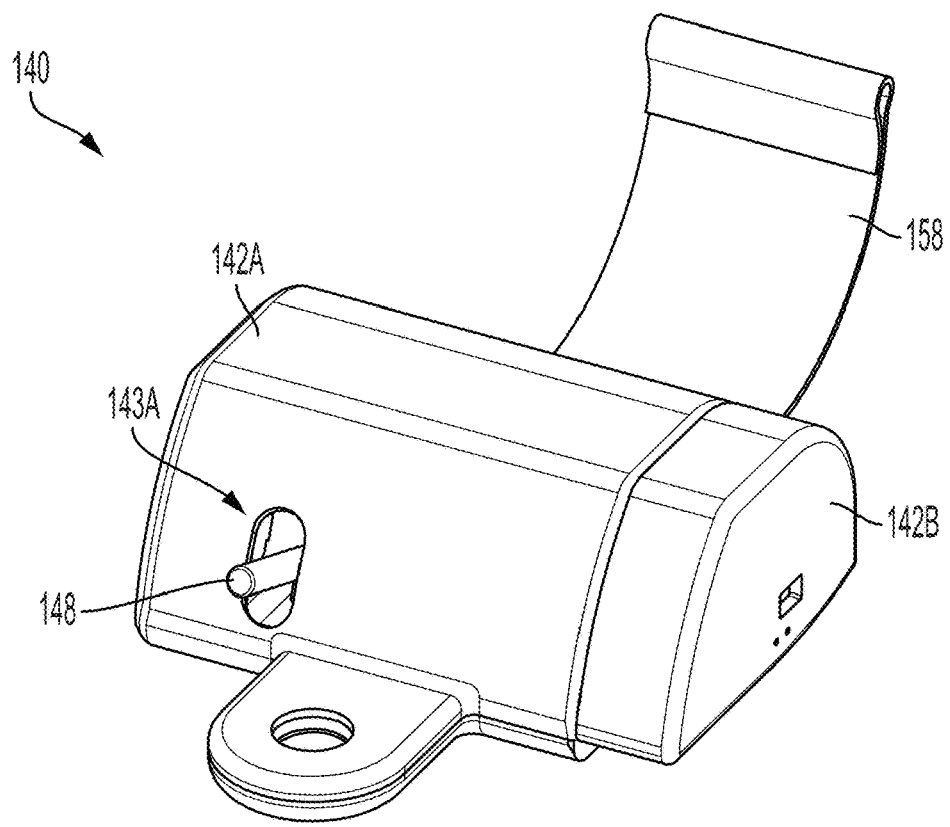
FIG. 8A is a front perspective view of a securement assembly.
Figure 8B:
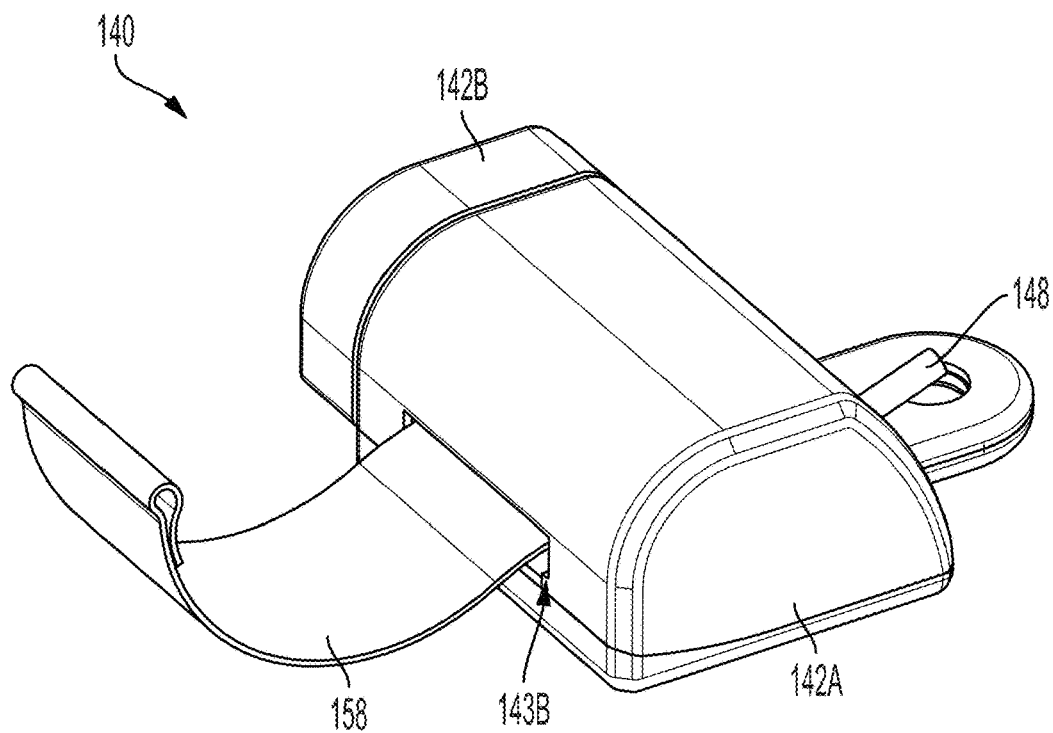
FIG. 8B is a rear perspective view of the securement assembly shown in FIG. 8A.
Figure 9:
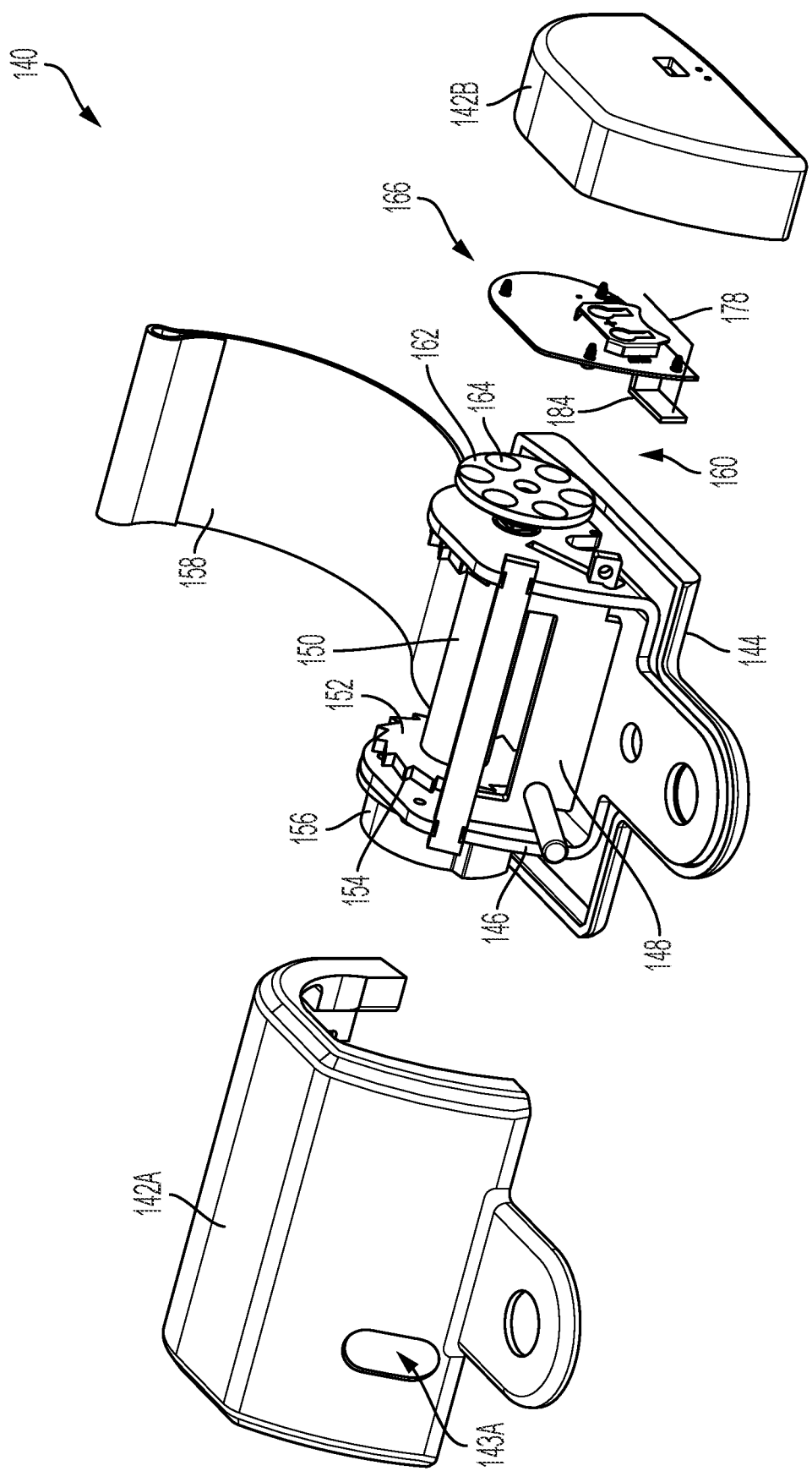
FIG. 9 is a front exploded perspective view of the securement assembly shown in FIG. 8A.

FIG. 8A is a front perspective view of securement assembly 140. FIG. 8B is a rear perspective view of securement assembly 140. FIG. 9 is a front exploded perspective view of securement assembly 140. Securement assembly 140 generally comprises housing 142A, housing 142B, base 144, frame 146, shaft 150, spring assembly 156, and electronics assembly 160. The following descriptions should be read in view of FIGS. 1A-B and 8A-9.

Housing 142A is operatively arranged to engage base 144 to enclose various components of securement assembly 140. Housing 142A comprises aperture 143A and aperture 143B. Frame 146 is arranged on base 144. In some embodiments, frame 146 is fixedly secured to base 144.

Shaft 150 is rotatably connected to frame 146. For example, shaft 150 may be rotatably engaged with holes in frame 146. Line or strap or webbing or belt 158 is connected to shaft 150 and is arranged to be wound thereabout. Spring assembly 156 is connected to a first end of shaft 150. In some embodiments, spring assembly 156 comprises a cover or housing that is secured to frame 146 and a spring (e.g., a coil spring) that is connected at a first end to the cover and a second end to shaft 150 and is operatively arranged to bias shaft 150 in a circumferential direction (i.e., to retract line 158).

In some embodiments, shaft 150 is biased (e.g., by spring assembly 156) in a circumferential direction so as to retract line 158 when not in use. When an occupant wishes to utilize securement assembly 140, line 158 is pulled out of housing 142A via aperture 143B which causes shaft 150 to displace in a circumferential direction. When the occupant wishes to be released from the seat or space, line 158 is disconnected and shaft 150 rotates in a circumferential direction causing line 158 to displace back into housing 142A (i.e., line 158 winds around shaft 150).

In some embodiments, securement assembly 140 further comprises a break or a mechanism that prevents rotation of shaft 150 in the event that vehicle 10 abruptly stops or the driver applies the breaks. For example, securement assembly 140 may comprise pawl 148 and one or more gears 152. Pawl 148 is pivotably or hingedly connected to frame 146. Gears 152 are non-rotatably connected to shaft 150 and comprise plurality of teeth 154. Pawl 148 is operatively arranged to engage teeth 154 to prevent line 158 from unwinding in order to prevent the occupant from being thrown from the seat. In some embodiments, pawl 148 is automatically engaged and disengaged from gears 152. In some embodiments, pawl 148 comprises a lever that extends through housing 142B via aperture 143A such that pawl 148 can be manually engaged and disengaged from gears 152. In some embodiments, pawl 148 may be biased, for example via a spring, into engagement or out of engagement with gears 152.

In some embodiments line 158 comprises a connector at the end thereof. The connector is any connection mechanism suitable for connecting line 158 and securing an object in vehicle 10. For example, for seats 16, 18, and 20, the connector may comprise a male buckle that connects to a female buckle (i.e., a standard vehicle seat belt). For spaces 22 and 24, the connector may comprise a hook or other suitable connector for tying down a wheelchair. Also for spaces 22 and 24, the connector may comprise a male buckle that connects to a female buckle. However, it should be appreciated that any connector suitable for properly securing a passenger and/or a wheelchair (or other cargo) to vehicle 10 may be used.

Electronics assembly 160 comprises plate 162, one or more magnets 164, and circuit 166. Housing 142B encloses electronics assembly 160 and is connected to housing 142A. Plate 162 is non-rotatably connected to a second end of shaft 150, the second end being opposite of the first end connected to spring assembly 156. Plate 162 comprises one or magnets fixedly secured thereto. In some embodiments, and as shown, plate 162 comprises a plurality of holes and magnets 164 are at least partially embedded in the holes. In some embodiments, electronics assembly comprises six magnets 164 circumferentially spaced about a center point of plate 162. Circuit 166 is arranged in close proximity with plate 162 and magnets 164, as will be described in greater detail below.

Figure 10A:
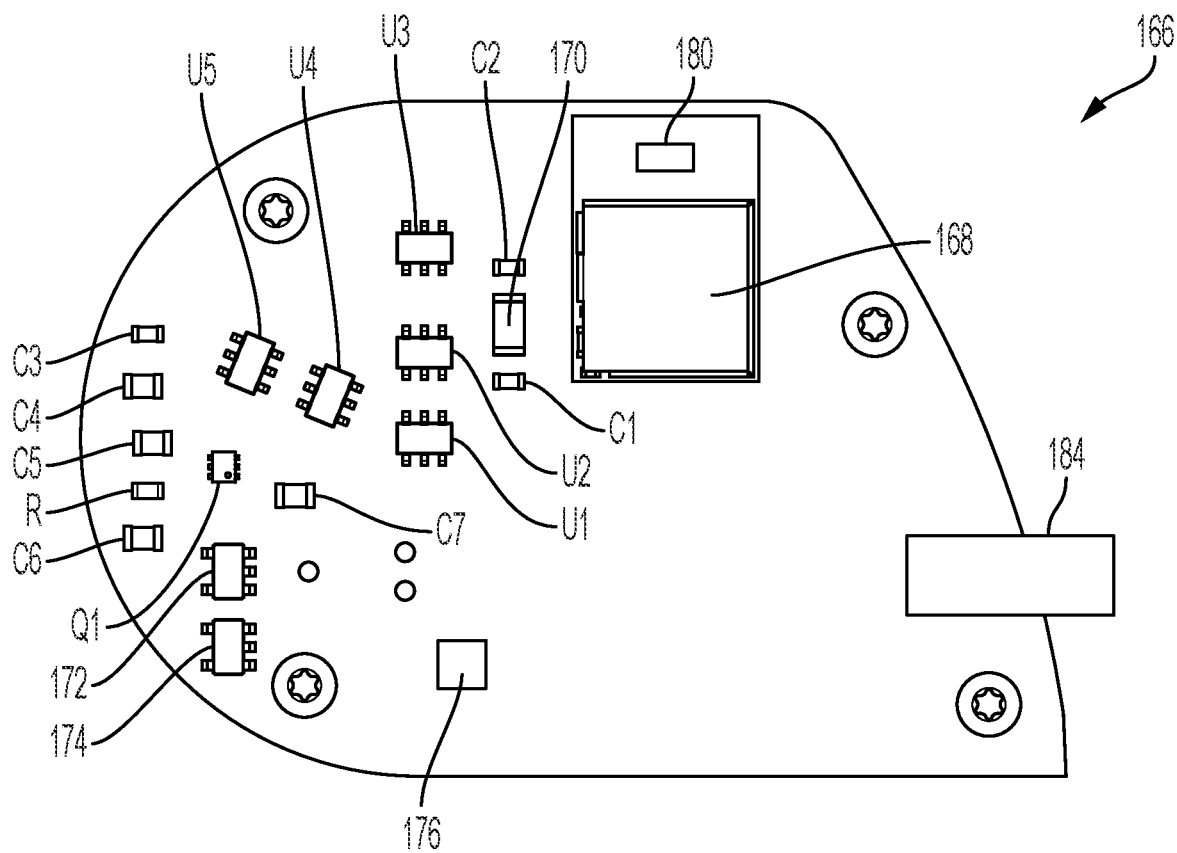
FIG. 10A is a front elevational view of a circuit.
Figure 10B:
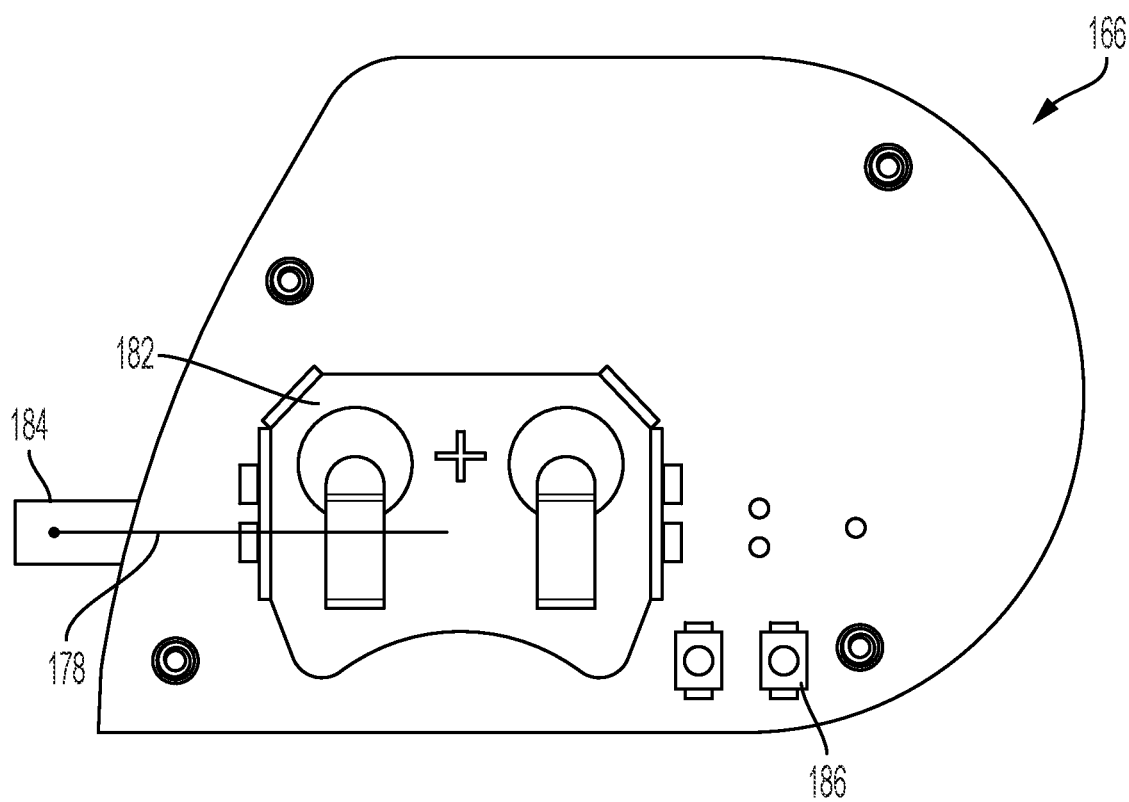
FIG. 10B is a rear elevational view of the circuit shown in FIG. 10A.
Figure 11:
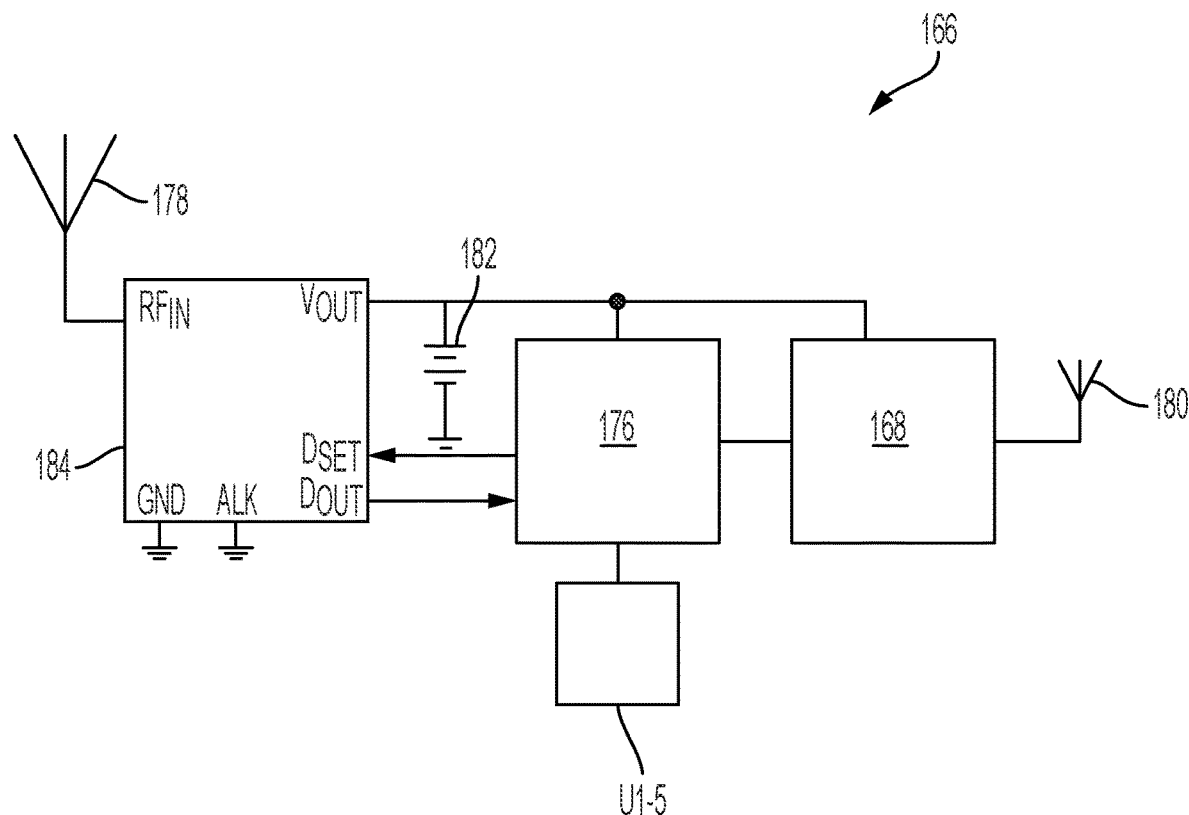
FIG. 11 is a schematic view of a circuit.

FIG. 10A is a front elevational view of circuit 166. FIG. 10B is a rear elevational view of circuit 166. FIG. 11 is a schematic view of circuit 166. Circuit 166 comprises radio module or transmitter 168, oscillator 170, regulator 172, energy harvesting module or chip or receiver 184, microprocessor 176, antenna 178, antenna 180, battery 182, one or more sensors U1-5, and transistor Q1. Circuit 166 may further comprise at least one resistor R and one or more capacitors C1-7.

Transmitter 168 is connected to communication antenna 180 and is operatively arranged to transmit data, for example, to computing device 300 as described above (e.g., data from sensors U1-5). In some embodiments, transmitter 168 transmits data via BLUETOOTH® communication. Oscillator 170 is operatively arranged to convert direct current DC from a power supply, for example battery 182, to an alternating current (AC) signal for use by transmitter 168. Transistor Q1 measures the battery life of battery 182.

Regulator 172 provides a stable voltage output (e.g., 3.3 volts) that microprocessor 176 needs to function safely. Regulator 172 receives DC input from energy harvesting module or chip 184, which can peak as high as 4.2 volts. Such peak voltages are too high for microprocessor 176, and thus regulator 172 maintains a safe voltage. Battery charging integrated circuit (IC) 174 provides an output which is conditioned to safely charge battery 182.

Energy harvesting converter chip or receiver module 184 is a receiver operatively arranged to receive wirelessly transmitted power from RF transmitter 90. Chip 184 is operatively arranged to convert RF energy received from RF transmitter 90 to DC power. Chip 184 is connected to power receiving antenna 178 to receive such signals. RF transmitter 90 is operatively arranged to transmit power wirelessly to receiver 184. In some embodiments, RF transmitter 90 is a POWERCASTER® transmitter that transmits power to receiver 184, for example a POWERHARVESTER® receiver chip or module, arranged on securement assembly 140. Such wireless transmission of power can be used to charge battery 182 and/or power the various components of circuit 166. The use of wireless power transmission is an important aspect of the present disclosure since it does not require vehicle 10 be modified to include wires to power the various comments of securement assembly 140. Since the present disclosure can be used as an aftermarket system (i.e., vehicle 10 can be retrofitted to include the system disclosed herein), running wires can be time intensive and costly, and also dangerous to passengers. In some embodiments, and as shown, RF energy harvesting receiver module 184 is arranged "off-board" or on a separate circuit board. Receiver module 184 receives RF signals from RF transmitter and converts them to DC power, which is then passed to the main circuit board to charge battery 182 or power the various elements thereon (e.g., sensors U1-5, microprocessor 176, transmitter 168, etc.). In some embodiments, antenna 178 extends from receiver 184 and wraps around the main circuit board.

Sensors U1-5 are operatively arranged to detect the magnetic field from magnets 164. In some embodiments, sensors U1-5 are Hall effect sensors. Magnets 164 are displaced circumferentially with respect to circuit 166, and sensors U1-5 detect such displacement. It should be appreciated that although a plurality of magnets are shown, plate 162 may comprise one or more magnets. Microprocessor 176 is connected to sensors U1-5 and is programmed to determine the number of rotations of shaft 150 based on the signals detected by sensors U1-5. Microprocessor 176 communicates such information to transmitter 168 to be sent to computing device 300. In some embodiments, sensors U1-5 are arranged in a "V" shape. For example, three sensors U1-3 are arranged linearly in a vertical line and two sensors U4-5 are arranged linearly in a line that is approximately 67.5 degrees counterclockwise from the vertical line. It should be appreciated that while five sensors are shown, circuit 166 may comprise any number of sensors suitable for detecting the magnetic field of magnets 164. In some embodiments, microprocessor 176 is built into and a part of transmitter 168.

Sensors U1-5 generally detect the number of revolutions that shaft 150 has incurred. Specifically, as line 158 is pulled out of housing 142A, shaft 150 rotates in a first circumferential direction. The number of rotations of shaft 150 in the first circumferential direction directly corresponds with the amount of line 158 that has been extended (and is in use). Sensors U1-5 also measure the number of revolutions that shaft 150 incurs in a second circumferential direction, opposite the first circumferential direction. For example, sensors U1-5 detect the number of times magnets 146 pass thereby in the first circumferential direction (for extension of line 158) and in the second circumferential direction (for retraction of line 146). Microprocessor 176 uses such information to determine how much of line 146 has been displaced from housing 142A and/or shaft 150. Such information (i.e., the number of revolutions of shaft 150 or the amount of line 158 that has been removed from housing 142A and/or shaft 150) is sent via wired connection or wirelessly to transmitter 168.

As previously described, transmitter 168 is generally a device that receives signals from sensors U1-5 and/or microprocessor 176 and transmits the data therein to a remote location via wired connection or wirelessly, for example, computing device 300. As such, in some embodiments, transmitter 176 comprises at least a receiver or receiving component for receiving signals from sensors U1-5 and/or microprocessor 176 and a transmission device. The transmission device is arranged to send a signal to a receiver in computing device 300 or at another remote location (not shown), for example, indicating the length of extended line 158 and/or the number of revolutions incurred by shaft 150. The transmission device generally comprises a transmitter. In some embodiments, the transmitter component of transmitter 168 includes antenna 180 and is operatively arranged to communicate with a remote receiver (e.g., a computer, a smartphone, an IPAD® tablet computer, a SURFACE® computer, or any other computing device) and can be utilized to send/receive a wireless signal/communication. It should be appreciated that "wireless communication(s)" as used herein is intended to mean Radio Frequency Identification (RFID) communication, BLUETOOTH® protocols, Near field Communication (NFC), Near Field Magnetic Inductance Communication (NFMIC), Wi-Fi, LTE, AIRDROP® communication, or any other wireless protocol sufficient to communicate with the remote receiver.

In an example embodiment, and as previously discussed, securement assembly 140 is used to send a signal to computing device 300, namely, securement assembly verification program 130, generally indicating the amount of line 158 that is in use (i.e., has been extended from the coil or shaft 150 or housing 142A).

In some embodiments, microprocessor or microcontroller 176 includes a memory element and a processing unit. The memory element is capable of storing a set of non-transitory computer readable instructions. The processing unit is arranged to execute the set of non-transitory computer readable instructions. In an example embodiment, the microprocessor 176 is programmed to perform the following steps: receive information from sensors U1-5 that line 158 has been extended from shaft 150 a distance and/or receive information from sensors U1-5 that shaft 150 has completed a number of revolutions (i.e., a number of revolutions in a first circumferential direction minus a number revolutions in a second circumferential direction); and, send a signal to computing device 300 or a remote receiver via transmitter 168 indicating such data.

In some embodiments, circuit 166 further comprises user switch 186 for optionally changing modes.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

| LIST OF REFERENCE NUMERALS | |
|---|---|
| 10 | Vehicle or securement assembly monitoring system |
| 12 | Seat |
| 14 | Seat |
| 16 | Seat |
| 18 | Seat |
| 20 | Seat |
| 22 | Space |
| 24 | Space |
| 30 | Seat detection device |
| 40 | Securement assembly/assemblies |
| 40A | Securement assembly/assemblies |
| 40B | Securement assembly/assemblies |
| 40C | Securement assembly/assemblies |
| 40D | Securement assembly/assemblies |
| 40E | Securement assembly/assemblies |
| 42 | Shaft |
| 44 | Marker |
| 46 | Line or strap or webbing or belt |
| 48 | Connector |
| 50 | Sensor |
| 60 | Sensor |
| 70 | Sensor |
| 80 | Transducer |
| 90 | Radio frequency (RF) transmitter |
| 100 | Securement assembly monitoring environment |
| 110 | Network |
| 120 | Database |
| 130 | Securement assembly verification program |
| 140 | Securement assembly |
| 142A | Housing |
| 142B | Housing |
| 143A | Aperture |
| 143B | Aperture |
| 144 | Base |
| 146 | Frame |
| 148 | Pawl |
| 150 | Shaft |
| 152 | Gear or gears |
| 154 | Teeth |
| 156 | Spring assembly |
| 158 | Line or strap or webbing or belt |
| 160 | Electronics assembly |
| 162 | Plate |
| 164 | Magnet or magnets |
| 166 | Circuit |
| 168 | Radio module or transmitter |
| 170 | Oscillator |
| 172 | Regulator |
| 174 | Battery charging integrated circuit (IC) |
| 176 | Microprocessor |
| 178 | Power receiving antenna |
| 180 | Communications antenna |
| 182 | Battery |
| 184 | Energy harvesting module or chip/receiver |
| 186 | Switch |
| 200 | Flow chart |
| 202 | Step |
| 204 | Step |
| 206 | Step |
| 208 | Step |
| 210 | Step |

-continued

LIST OF REFERENCE NUMERALS

| | |
|---|---|
| 212 | Step |
| 214 | Step |
| 300 | Computing device |
| 302 | Communications fabric |
| 304 | Processing units |
| 306 | Memory |
| 308 | Persistent storage |
| 310 | Communications unit |
| 312 | Input/output (I/O) interfaces |
| 316 | Random access memory (RAM) |
| 318 | Cache memory |
| 320 | External device(s) |
| 322 | Display |
| 416 | Section or seat indicator |
| 418 | Section or seat indicator |
| 420 | Section or seat indicator |
| 422 | Section or space indicator |
| 422A | Portion |
| 422B | Portion |
| 422C | Portion |
| 422D | Portion |
| 422E | Portion |
| 424 | Section or space indicator |
| AD1 | Axial direction |
| AD2 | Axial direction |
| C1 | Capacitor |
| C2 | Capacitor |
| C3 | Capacitor |
| C4 | Capacitor |
| C5 | Capacitor |
| C6 | Capacitor |
| C7 | Capacitor |
| CD1 | Circumferential direction |
| CD2 | Circumferential direction |
| D1 | Distance |
| D2 | Distance |
| L1 | Length |
| L2 | Length |
| Q1 | Transistor |
| R | Resistor |
| R1 | Radius |
| R2 | Radius |
| U1 | Sensor |
| U2 | Sensor |
| U3 | Sensor |
| U4 | Sensor |
| U5 | Sensor |

What is claimed is:

1. A retractable securement assembly, comprising:
a frame;
a shaft rotatably connected to the frame, the shaft including a first end and a second end;
a spring assembly connected to the first end, the spring assembly operatively arranged to bias the shaft in a first circumferential direction;
a line connected to the shaft and arranged to form a coil around the shaft in a fully retracted state; and
an electronics assembly, comprising:
a plate non-rotatably connected to the second end;
a circuit operatively arranged proximate the plate to retrieve information about the shaft or the line; and
a transmitter including a first antenna operatively arranged to wirelessly transmit the information to a remote location;
wherein the circuit comprises a wireless power transmission receiver operatively arranged to convert received radio frequency (RF) signals to direct current (DC) power, the wireless power transmission receiver including a second antenna that wraps around the circuit.

2. The retractable securement assembly as recited in claim 1, wherein the plate comprises at least one magnet and the circuit comprises at least one sensor, the at least one sensor operatively arranged to detect a magnetic field of the magnet.

3. The retractable securement assembly as recited in claim 2, wherein the circuit further comprises a microprocessor, the microprocessor operatively arranged to, based on the detected magnetic field, determine a length of the line extended from the coil or the shaft, in an extended state.

4. The retractable securement assembly as recited in claim 2, wherein the circuit further comprises a microprocessor, the microprocessor operatively arranged to, based on the detected magnetic field, determine a number of revolutions of the shaft.

5. The retractable securement assembly as recited in claim 1, further comprising:
a gear non-rotatably connected to the shaft and including a plurality of teeth; and
a pawl pivotably connected to the frame and operatively arranged to engage the teeth to prevent rotation of the shaft, wherein the pawl extends through a hole in the frame.

6. A system for monitoring a securement assembly in a vehicle, comprising:
a radio frequency (RF) energy transmitter;
a frame;
a shaft rotatably connected to the frame, the shaft including a first end and a second end;
a line connected to the shaft and arranged to form a coil around the shaft in a fully retracted state;
an electronics assembly, comprising:
a plate non-rotatably connected to the second end and including a plurality of magnets; and
a circuit including:
one or more sensors operatively to detect a magnetic field of the plurality of magnets; and
a RF receiver module operatively arranged to receive wirelessly transmitted RF energy from the RF energy transmitter and convert the RF energy into direct current (DC) power;
a microprocessor; and
a regulator operatively arranged to limit the voltage supplied to the microprocessor from the RF receiver module, wherein the circuit is operatively to transmit information to a remote location;
one or more computer processors; and
program instructions stored on a computer readable storage media for execution by at least one of the one or more computer processors, the program instructions comprising:
program instructions to receive a first input from the one or more sensors;
program instructions to, based on the first input, determine that a seat and/or a space in the vehicle is occupied;
program instructions to receive a second input from the one or more sensors; and
program instructions to, based on the first and/or second input, determine if the securement assembly of the seat and/or space is secured.

* * * * *